US012620713B2

(12) United States Patent
Takayama et al.

(10) Patent No.: US 12,620,713 B2
(45) Date of Patent: May 5, 2026

(54) PATCH ANTENNA AND ANTENNA DEVICE

(71) Applicant: YOKOWO CO., LTD., Tokyo (JP)

(72) Inventors: Yuki Takayama, Tomioka (JP); Bunpei Hara, Tomioka (JP)

(73) Assignee: YOKOWO CO., LTD., Tokyo (JP)

(*) Notice: Subject to any disclaimer, the term of this patent is extended or adjusted under 35 U.S.C. 154(b) by 0 days.

(21) Appl. No.: 18/689,503

(22) PCT Filed: Sep. 7, 2022

(86) PCT No.: PCT/JP2022/033526
§ 371 (c)(1),
(2) Date: Mar. 6, 2024

(87) PCT Pub. No.: WO2023/047954
PCT Pub. Date: Mar. 30, 2023

(65) Prior Publication Data

US 2025/0141109 A1 May 1, 2025

(30) Foreign Application Priority Data

Sep. 22, 2021 (JP) ................................ 2021-153829

(51) Int. Cl.
*H01Q 9/04* (2006.01)
*H01Q 21/06* (2006.01)

(52) U.S. Cl.
CPC ......... *H01Q 9/0414* (2013.01); *H01Q 21/065* (2013.01)

(58) Field of Classification Search
CPC .. H01Q 1/32; H01Q 1/34; H01Q 1/36; H01Q 1/38; H01Q 1/48; H01Q 1/50; H01Q 9/0407; H01Q 9/0414; H01Q 13/08; H01Q 21/065
See application file for complete search history.

(56) References Cited

U.S. PATENT DOCUMENTS 5,767,810 A 6/1998 Hagiwara et al.

FOREIGN PATENT DOCUMENTS

| | | | | |
|---|---|---|---|---|
| JP | H03-157005 A | 7/1991 | |
| JP | H07273533 A | 10/1995 | |
| JP | H09-148840 A | 6/1997 | |
| JP | 2004-072320 A | 3/2004 | |
| JP | 2005-318438 A | 11/2005 | |
| JP | 2008109252 A | 5/2008 | |
| JP | 2018-042109 A | 3/2018 | |
| KR | 20090110175 A | * 10/2009 | ........... H01Q 9/0428 |
| WO | 96/34426 A1 | 10/1996 | |

OTHER PUBLICATIONS

International Search Report and Written Opinion mailed on Nov. 15, 2022, received for PCT Application PCT/JP2022/033526, filed on Sep. 7, 2022, 12 pages including English Translation.
Office Action issued Dec. 9, 2025 in counterpart Japanese patent application No. JP2023-549462 (11 pages; with English machine translation).

* cited by examiner

*Primary Examiner* — Hoang V Nguyen
(74) *Attorney, Agent, or Firm* — XSENSUS LLP

(57) ABSTRACT

A patch antenna includes: a first element; and a second element located so as to face the first element, wherein the first element includes a first main body portion facing the second element, and at least one first bent portion extending from the first main body portion toward the second element, and a wave source is generated between the second element and the first bent portion.

20 Claims, 20 Drawing Sheets

PATCH ANTENNA AND ANTENNA DEVICE

CROSS-REFERENCE TO RELATED APPLICATIONS

The present application is based on PCT filing PCT/JP2022/033526, filed Sep. 7, 2022, which claims priority from Japanese Patent Application No. 2021-153829, filed Sep. 22, 2021, the contents of each are hereby incorporated by reference.

TECHNICAL FIELD

The present disclosure relates to a patch antenna and an antenna device.

BACKGROUND ART

PTL1 discloses a patch antenna including a ground conductor and a radiating element that are both formed of plate-shaped members.

CITATION LIST

Patent Literature

[PTL 1] Japanese Patent Application Publication No. 2018-42109

SUMMARY OF INVENTION

Technical Problem

The patch antenna described in PTL 1 is an antenna in which the direction normal to the plate surface of the radiating element is the direction of radiation, and the antenna has a high directivity in this direction of radiation. However, if the area of the plate surface of the ground conductor is reduced in order to downsize the patch antenna, radio waves may be emitted in the direction opposite to the direction of radiation as well, resulting in the reduction in the gain in the direction of radiation.

An example of an object of the present disclosure is to downsize a patch antenna and suppress reduction in the gain in the direction of radiation. Other objects of the present disclosure will become apparent from the present specification given herein.

Solution to Problem

An aspect of the present disclosure is a patch antenna comprising: a first element; and a second element located so as to face the first element, wherein the first element includes a first main body portion facing the second element, and at least one first bent portion extending from the first main body portion toward the second element, and a wave source is generated between the second element and the first bent portion.

According to an aspect described above of the present disclosure, it is possible to downsize a patch antenna and suppress the reduction in the gain in the direction of radiation.

DESCRIPTION OF EMBODIMENTS

Figure 1:
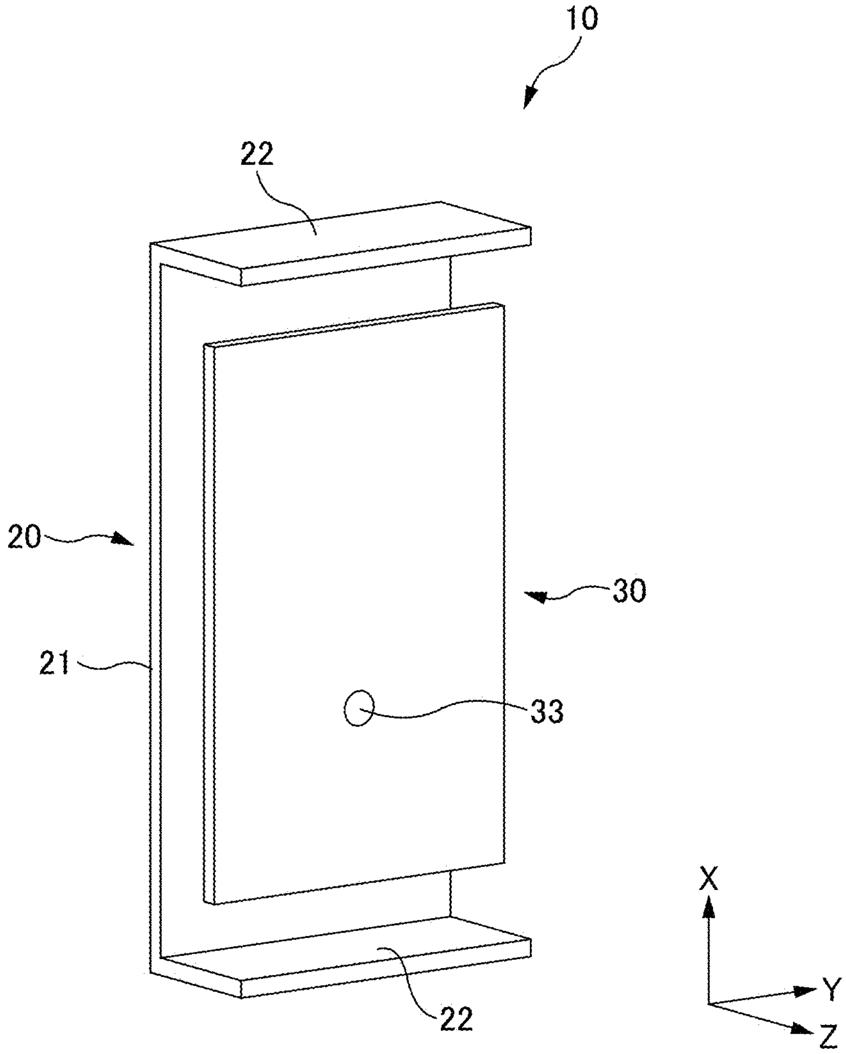
FIG. 1 is a perspective view of a patch antenna 10 of a first embodiment.

At least following matters will become apparent from the description of the present specification and the accompanying drawings.

Hereinafter, preferred embodiments of the present disclosure will be described with reference to the drawings. The same or equivalent components, members, and the like illustrated in the drawings are given the same reference numerals, and an overlapping description is omitted as appropriate.

==Patch Antenna 10==

<<Overview of Patch Antenna 10 of First Embodiment>>

First, an overview of a patch antenna 10 of a first embodiment will be explained with reference to FIGS. 1 to 2B.

Figure 2A:
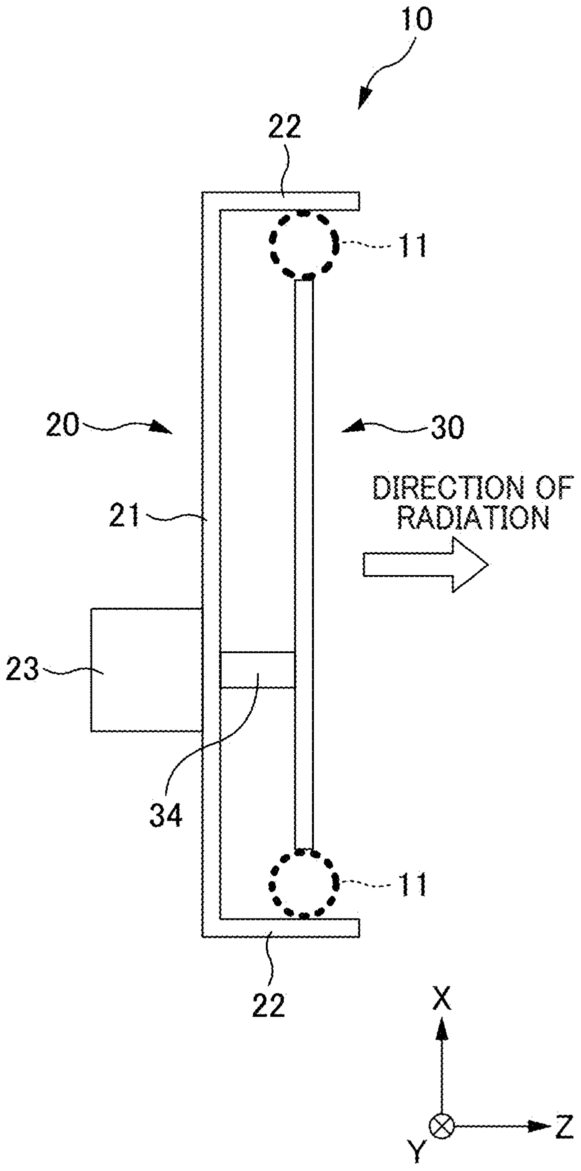
FIG. 2A is a side view of a patch antenna 10 of a first embodiment.

FIG. 1 is a perspective view of the patch antenna 10 of the first embodiment. FIG. 2A is a side view of the patch antenna 10 of the first embodiment, and FIG. 2B is a front view of the patch antenna 10 of the first embodiment.

<<Definition of Directions and the Like>>

In the following, as given in FIGS. 1 to 2B, three orthogonal left-handed axes will be defined, and explanations will be given according to the directions along the axes. Note that the coordinate origin of the three orthogonal axes is the center of a radiating element 30 (described later).

A "+X direction" and a "+Y direction" are defined as directions that are parallel to the plate surface of the radiating element 30 (described later) of the patch antenna 10 and are orthogonal to each other. In the patch antenna 10 of the first embodiment illustrated in FIGS. 1 to 2B, the +X direction is also the direction from a feeding portion 33 (described later) of the radiating element 30 toward the center of the radiating element 30. Further, a "+Z direction" is defined as the direction normal to the plate surface of the radiating element 30. Note that a "−X direction" is defined as the direction opposite to the +X direction. Further, both the +X direction and the −X direction, or either one of the +X direction or the −X direction may be simply referred to as the "X direction". Further, as in the X direction and the −X direction with respect to the +X direction, the "Y direction" and the "−Y direction" with respect to the +Y direction, and the "Z direction" and the "−Z direction" with respect to the +Z direction are also defined.

Here, the "center" of the radiating element 30 refers to the center point, in other words, the geometric center, in the shape of the outer edge of the radiating element 30 in the front view of the radiating element 30 viewed in the −Z direction.

Figure 7:
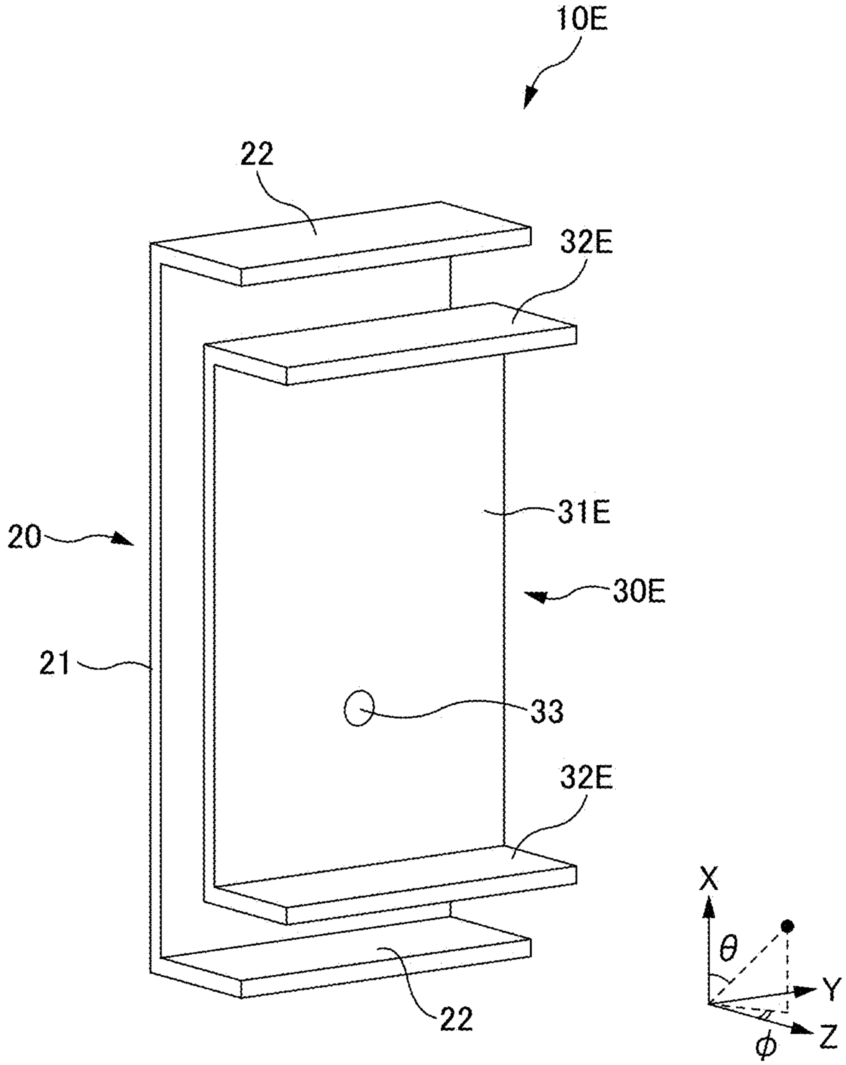
FIG. 7 is a perspective view of a patch antenna 10E of a third embodiment.
Figure 8A:
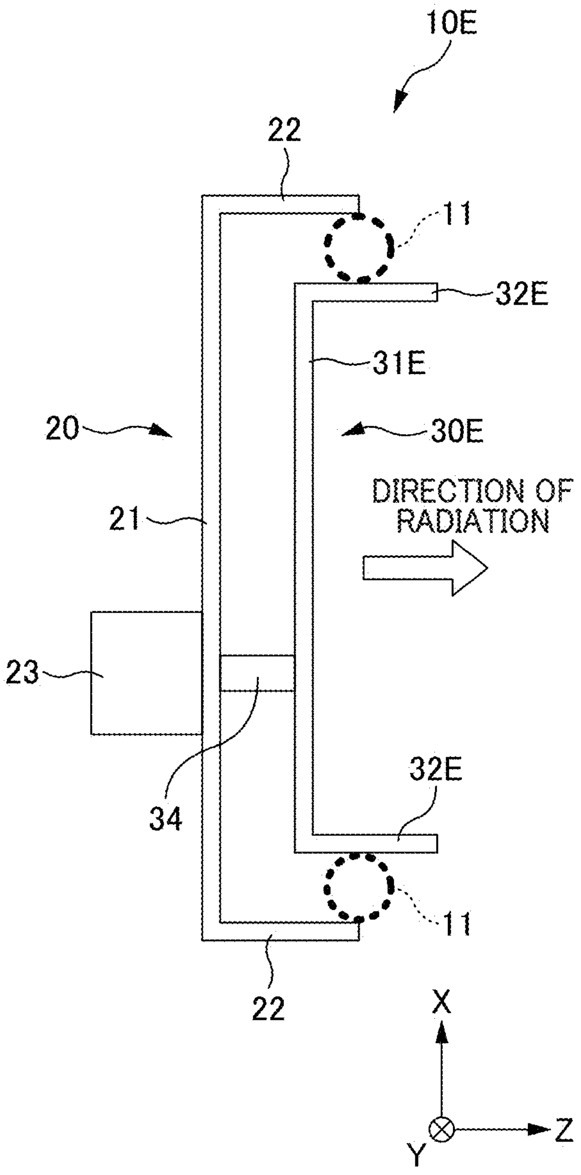
FIG. 8A is a side view of a patch antenna 10E of a third embodiment.
Figure 8B:
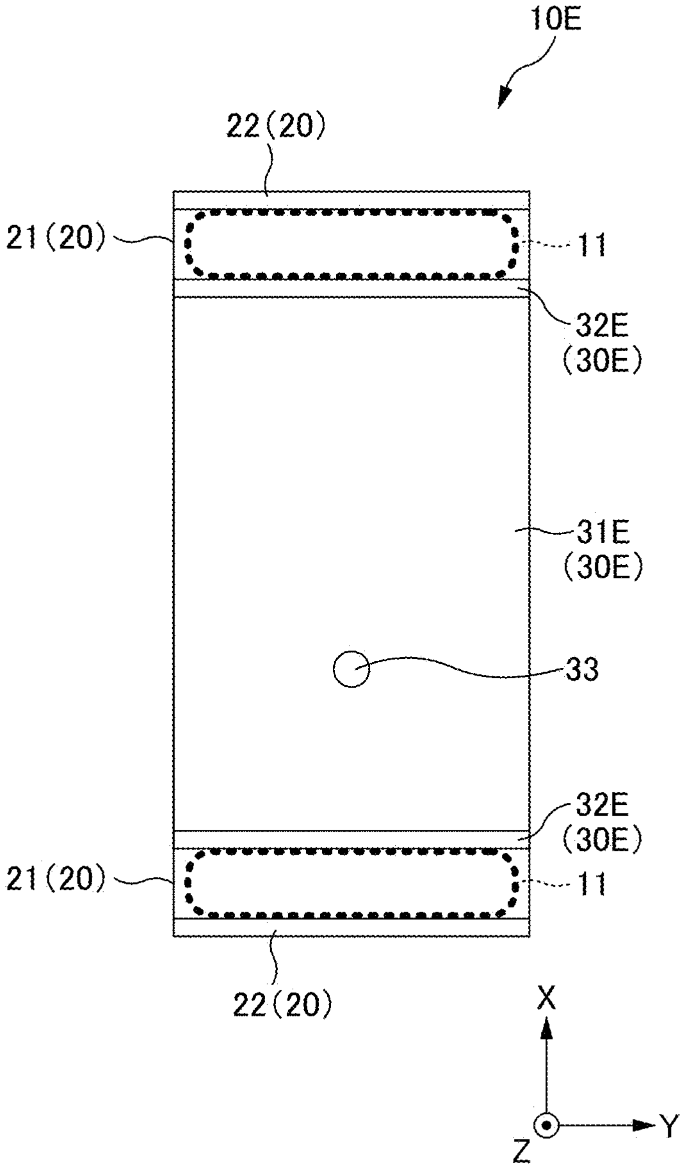
FIG. 8B is a front view of a patch antenna 10E of a third embodiment.

Further, the "plate surface" of the radiating element 30 refers to a predetermined surface of a plate-shaped member when the radiating element is mainly formed of the plate-shaped member. Here, for example, in the case of the radiating element 30, which is illustrated in FIGS. 1 to 2B and is constituted by only the plate-shaped member, the predetermined surface is the surface on the +Z direction side of the radiating element 30 (hereinafter may also be referred to as "front surface"). In addition, for example, in the case of a radiating element 30E including a radiating element bent portion 32E (described later), which is illustrated in FIGS. 7 to 8B described later, the predetermined surface of the radiating element is the front surface of a radiating element main body portion 31E (described later), which is formed as a plate-shaped member. Further, when the radiating element is formed of a conductive pattern provided at a substrate, the "plate surface" of the radiating element is the front surface of the substrate, at which the conductive pattern is formed.

The "direction normal to the plate surface" of the radiating element 30 is, as is apparent from the fact that it is defined as the +Z direction, a direction perpendicular to the plate surface of the radiating element 30, and is the direction from the surface on the −Z direction side (hereinafter may be referred to as "back surface") toward the surface on the +Z direction side (front surface). In other words, the "direction normal to the plate surface" of the radiating element 30 does not refer to both the direction from the back surface to the front surface of the radiating element 30 and the direction from the front surface to the back surface, but refers to the fixed direction.

Further, in the patch antenna 10, the +Z direction is the direction of radiation, as will be described later. Further, in the patch antenna 10, the +Z direction is the direction of radiation, as will be described later.

Here, in the figures described below including FIGS. 1 to 2B, directions are given in the figures as reference directions. The reason why they are given as reference directions is that the origin of the coordinates of the three axes orthogonal to one another correctly should be the center of the radiating element 30, as described above. Accordingly, the directions given in the figures are given for reference only.

<Use and Configuration of Patch Antenna 10>

The patch antenna 10 is a vehicular antenna supporting radio waves in the frequency band used for Vehicle to Everything (V2X: vehicle-to-vehicle communication, road-to-vehicle communication), for example. In an embodiment of the present disclosure, the frequency band used for V2X is, for example, 5.9 GHz band (5.85 GHz to 5.925 GHz), and the target frequency is adjusted to 5.8875 GHz, for example. However, the patch antenna 10 may support Global Navigation Satellite System (GNSS) and Sirius XM (SXM) radio waves, for example, in addition to V2X radio waves. Further, the radio wave communication standards and the frequency bands supported by the patch antenna 10 are not limited to those described above, and may be other communication standards and frequency bands, and the patch antenna 10 may be an antenna other than that of vehicular use. The patch antenna 10 is capable of at least one of reception and transmission of radio waves (signals) of the desired frequency band.

In an embodiment of the present disclosure, the term "vehicular" refers to being mountable to a vehicle, and thus it is not limited to one attachable to a vehicle, but also includes one to be brought into a vehicle and used in a vehicle. In addition, it is assumed that the patch antenna 10 of an embodiment of the present disclosure is used for a "vehicle" which is a wheeled vehicle, but it is not limited thereto, but may be used for a movable body such as a flight vehicle including a drone and the like, a probe vehicle, a construction machinery, an agricultural machinery, a vessel, and the like without wheels for example.

The patch antenna 10 includes a ground conductor 20 and the radiating element 30.

The ground conductor 20 is a conductive element to which the outer conductor (not illustrated) of a feeder is connected. The ground conductor 20 is located so as to face the radiating element 30, as illustrated in FIGS. 1 and 2A. In an embodiment of the present disclosure, the ground conductor 20 is located on the −Z direction side relative to the radiating element 30, and is arranged in parallel thereto. Note that the detailed configuration of the ground conductor 20 will be described later.

The radiating element 30 is a conductive element to which an inner conductor (not illustrated) of the feeder is connected. The radiating element 30 is located so as to face the ground conductor 20, as illustrated in FIGS. 1 and 2A. In an embodiment of the present disclosure, the radiating element 30 is located on the +Z direction side relative to the ground conductor 20 and arranged parallel thereto. Note that the ground conductor 20 and the radiating element 30 are not limited to being parallel to each other. At least one of the ground conductor 20 or the radiating element 30 may be arranged to be inclined at a predetermined angle, by being arranged to be rotated about a predetermined axis along the X direction, the Y direction, or the Z direction relative to the other thereof. Furthermore, at least one of the ground conductor 20 or the radiating element 30 may have such a curved shape as to be close to each other, or such a curved shape as to be away from each other. Alternatively, at least one of the ground conductor 20 and or the radiating element 30 may have such a bent shape as to be close to each other, or may have such a bent shape as to be away from each other.

Figure 2B:
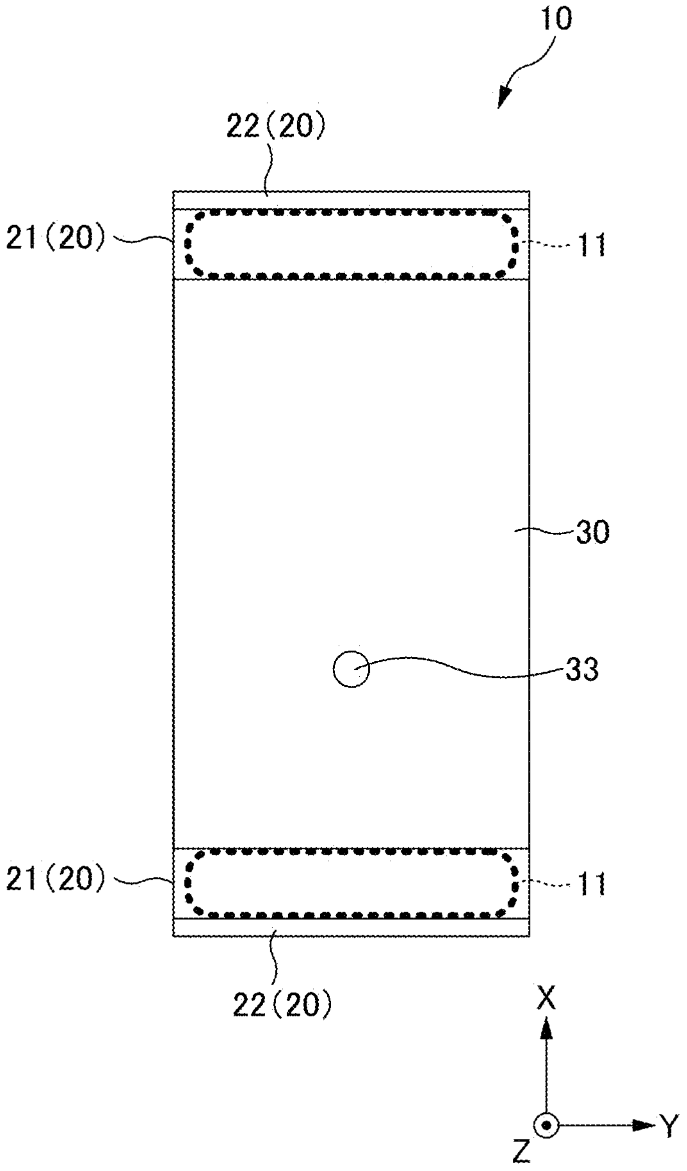
FIG. 2B is a front view of a patch antenna 10 of a first embodiment.

The radiating element 30 is formed of a metal plate-shaped member (metal plate) in a substantially quadrilateral shape in an embodiment of the present disclosure, as illustrated in FIGS. 1 to 2B. Here, the term "substantially quadrilateral shape" means a shape consisting of four sides including a square or a rectangle, for example, and at least part of corners thereof may be cut away obliquely relative to a side thereof, for example. Further, in the "substantially quadrilateral" shape, a recess (recessed portion) or a protrusion (protruding portion) may be provided at part of sides thereof. Note that the shape of the radiating element 15A is not limited to a substantially quadrilateral shape, but may be a circular shape, an elliptic shape, or the like, for example. That is, the radiating element 15A may have any shape as long as it can perform at least one of reception or transmission of signals (radio waves) of the desired frequency band.

The radiating element 30 includes a feeding portion 33 as illustrated in FIGS. 1 to 2B. The feeding portion 33 is a portion including a feeding point at which the radiating element 30 is electrically connected to a feeder not illustrated. The radiating element 30 of an embodiment of the present disclosure employs a configuration in which one feeding point 33 is provided, that is, a single-feed system. The radiating element 30 is configured so as to be able to perform at least one of transmission or reception of radio waves of linearly polarized waves. However, the radiating element 30 may employ a quadruple-feed system or a double-feed system so as to be able to perform at least one of transmission or reception of radio waves of desired polarization, for example. Further, the radiating element 30 may also support radio waves of the circularly polarized waves, without being limited to radio waves of the linearly polarized waves such as vertically polarized waves and horizontally polarized waves.

Further, the radiating element 30 includes an inner conductor connection portion 34 to which the inner conductor of the feeder (not illustrated) is connected. The inner conductor connection 34 is provided at the back surface of the radiating element 30, as illustrated in FIG. 2A.

In an embodiment of the present disclosure, the plate surface of the radiating element 30 is arranged perpendicular to the horizontal plane. Here, the horizontal plane refers to a plane perpendicular to the direction of gravity.

In addition, out of the two the elements of the ground conductor and the radiating element, the element on the side opposite to the direction of radiation of the patch antenna may be referred to as "first element," and the element on the side of the direction of radiation of the patch antenna may be referred to as "second element". In the patch antenna 10 of an embodiment of the present disclosure, the ground conductor 20 is the first element, and the radiating element 30 is the second element. In addition, both the first element and the second element may be simply referred to as "element". Further, when giving a common explanation of the first element and the second element, either one the first element or the second element may be simply referred to as "element".

COMPARATIVE EXAMPLE

Next, before explaining the characteristics of the configuration of the patch antenna 10 of an embodiment of the present disclosure, the patch antenna 10A as a comparative example will be explained.

Figure 3A:
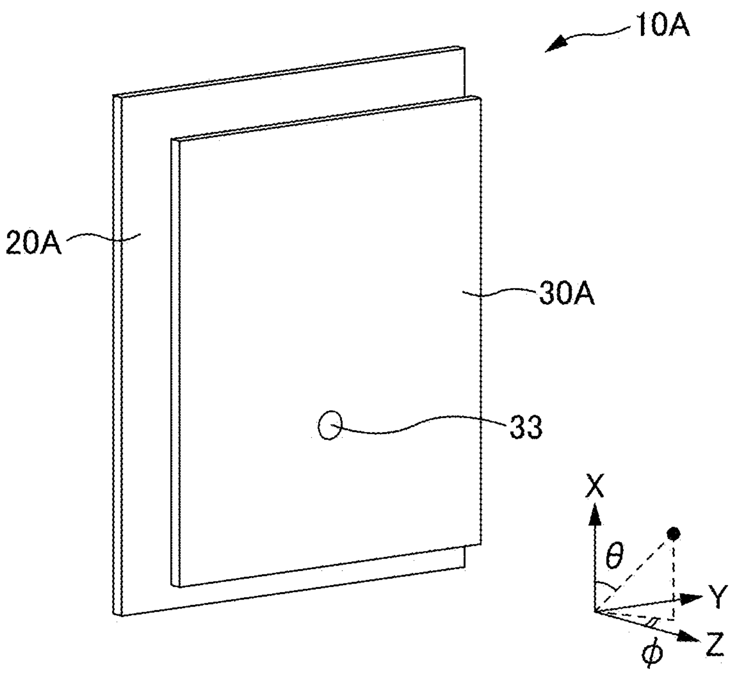
FIG. 3A is a perspective view of a patch antenna 10A of a comparative example.
Figure 3B:
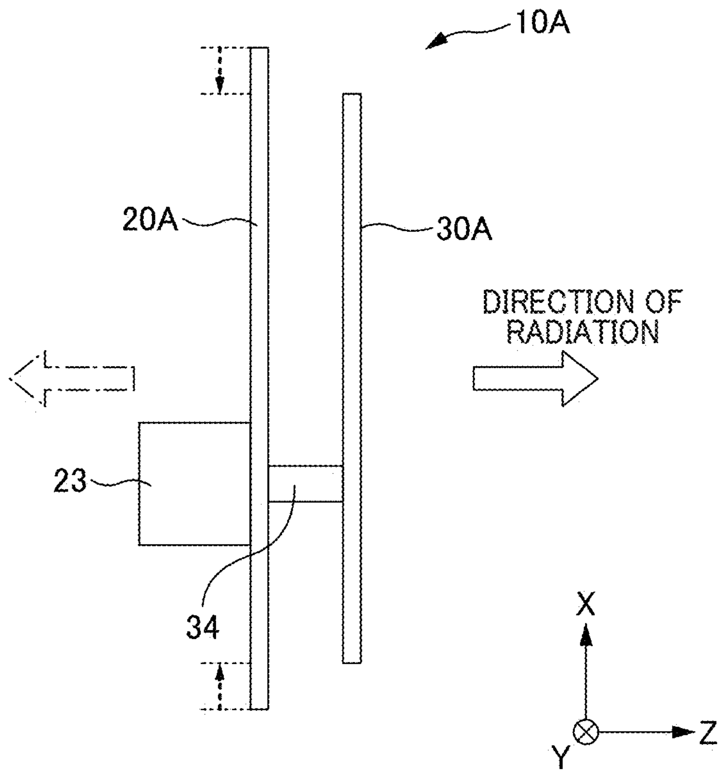
FIG. 3B is a side view of a patch antenna 10A of a comparative example.

FIG. 3A is a perspective view of the patch antenna 10A of a comparative example, and FIG. 3B is a side view of the patch antenna 10A of a comparative example.

As illustrated in FIGS. 3A and 3B, in the patch antenna 10A of a comparative example, both of the ground conductor 20A and the radiating element 30A are formed of metal plate-shaped members (metal plates). Further, in the front view of the patch antenna 10A viewed in the −Z direction, the ground conductor 20A is configured to have the area of the plate surface larger than that of the radiating element 30A.

The patch antenna 10A, which includes the ground conductor 20A and the radiating element 30A illustrated in FIGS. 3A and 3B, has the direction of radiation in the +Z direction (the direction normal to the plate surface of the radiating element 30A), and has a high directivity in this direction of radiation.

Due to a request to downsize the patch antenna 10A, as given by the dotted line with an arrow in FIG. 3B, a configuration may be such that the area of the plate surface of the ground conductor 20A is reduced such that the ground conductor 20A has the same size as that of the radiating element 30A, for example. In this case, as given by the dashed-dotted arrow in FIG. 3B, radio waves are radiated also to the side opposite to the direction of radiation, and the gain in the direction of radiation may decrease.

Thus, in the patch antenna 10 of an embodiment of the present disclosure, the shape of the ground conductor 20 is set different from that of the patch antenna 10A of a comparative example, as illustrated in FIGS. 1 to 2B described above. This makes it possible to downsize the patch antenna 10 and suppress the reduction in the gain in the direction of radiation.

<<Characteristics of Patch Antenna 10 in First Embodiment>>

The ground conductor 20 includes the ground conductor main body portion 21 and the ground conductor bent portions 22, as illustrated in FIGS. 1 to 2B.

The ground conductor main body portion 21 is part of the ground conductor 20 that is formed as a metal plate-shaped member (metal plate). The ground conductor main body portion 21 includes an outer conductor connection portion 23 to which the outer conductor (not illustrated) of the feeder is connected. The outer conductor connection portion 23 is provided at the back surface of the ground conductor main body portion 21, as illustrated in FIG. 2A.

Each of the ground conductor bent portions 22 is a part extending from the ground conductor main body portion 21. In an embodiment of the present disclosure, such a ground conductor bent portion 22 is formed by bending from the end part of the ground conductor main body portion 21 formed of a metal plate. However, the ground conductor bent portion 22 may be a metal plate separate from the ground conductor main body portion 21, and be connected (joined) so as to extend from the end part of the ground conductor main body portion 21.

Note that a configuration may be such that each of the ground conductor main body portion 21 and the ground conductor bent portion 22 is formed of the conductive pattern provided at the substrate without being formed of a metal plate, and the ground conductor main body portion 21 and the ground conductor bent portion 22 are electrically connected. Alternatively, a configuration may be such that the ground conductor main body portion 21 is formed of the conductive pattern provided at the substrate, the ground conductor bent portion 22 is formed of a metal plate, and the ground conductor main body portion 21 and the ground conductor bent portion 22 are electrically connected. Further alternatively, a configuration may be such that the ground conductor main body portion 21 is formed of a metal plate, the ground conductor bent portion 22 is formed of the conductive pattern provided at the substrate, and the ground conductor main body portion 21 and the ground conductor bent portion 22 are electrically connected. The substrate may be a dielectric substrate such as a printed circuit board and the like, or a substrate made of resin and the like.

When the ground conductor main body portion 21 and the ground conductor bent portion 22 are formed of the conductive patterns provided at the substrate made of resin and the like, it is possible to use Molded Interconnect Device (MID) technology capable of forming a conductive pattern at a resin having a complex three-dimensional shape. For example, a configuration may be such that the conductive pattern is formed, using MID technology, at the resin having such shapes as the ground conductor main body portion 21 and the ground conductor bent portion 22 illustrated in FIGS. 1 to 2B, or the ground conductor bent portion 22 is formed, using MID technology, at a casing made of resin and the like, and is electrically connected to the ground conductor main body portion 21 that is separate therefrom.

Furthermore, when the ground conductor main body portion 21 and the ground conductor bent portion 22 are formed of the conductive patterns provided at the substrate, the ground conductor main body portion 21 and the ground conductor bent portion 22 may be integrally formed of a flexible substrate.

In the patch antenna 10 of an embodiment of the present disclosure, the ground conductor bent portions 22 are respectively provided at two ends in the X direction of the ground conductor main body portion 21, as illustrated in FIGS. 1 to 2B. That is, the patch antenna 10 of an embodiment of the present disclosure includes two ground conductor bent portions 22. Then, the two ground conductor bent portions 22 are located so as to face each other through the ground conductor main body portion 21 therebetween. However, the ground conductor bent portion 22 may be provided at only one of the two ends in the X direction of the ground conductor main body portion 21 (the end part on the +X direction side or the end part on the −X direction side). Further, the ground conductor bent portion 22 may be provided at each of two ends in the Y direction of the ground conductor main body portion 21, or may be provided at each of two ends in the X direction of the ground conductor main body portion 21 as well as at each of two ends in the Y direction of the ground conductor main body portion 21. Furthermore, the patch antenna 10 may have three or more ground conductor bent portions 22.

Further, in the patch antenna 10 of an embodiment of the present disclosure, each of the ground conductor bent portions 22 extends so as to stand upright from the ground conductor main body portion 21, as illustrated in FIG. 2A. That is, each ground conductor bent portion 22 extends at an inclination angle of 90° with respect to the plate surface of the ground conductor main body portion 21. However, the inclination angle of the ground conductor bent portion 22 with respect to the plate surface of the ground conductor main body portion 21 may be an obtuse angle or an acute angle.

Here, the inclination angle of the ground conductor bent portion 22 with respect to the plate surface of the ground conductor main body portion 21 refers to an angle between the plate surface of the ground conductor main body portion 21 and the surface of the ground conductor bent portion 22 on the ground conductor main body portion 21 side. Accordingly, when the inclination angle of the ground conductor bent portion 22 with respect to the plate surface of the ground conductor main body portion 21 is an obtuse angle, the ground conductor bent portion 22 is inclined to the side opposite to (to the outer side relative to) the center of the ground conductor main body portion 21. Further, when the inclination angle of the ground conductor bent portion 22 with respect to the plate surface of the ground conductor main body portion 21 is an acute angle, the ground conductor bent portion 22 is inclined toward the center (to the inner side) of the ground conductor main body portion 21.

However, the two ground conductor bent portions 22 respectively provided at two ends in the X direction of the ground conductor main body portion 21 may extend so as to form different inclination angles, respectively, with respect to the ground conductor main body portion 21. For example, of the two ground conductor bent portions 22, the ground conductor bent portion 22 on the +X direction side may extend to form an obtuse inclination angle with respect to the ground conductor main body portion 21, and the ground conductor bent portion 22 on the −X direction side may extend to form an acute inclination angle with respect to the ground conductor main body portion 21.

Further, in the patch antenna 10 of an embodiment of the present disclosure, each of the ground conductor bent portions 22 extends in such a manner as to bend from the ground conductor main body portion 21, as illustrated in FIG. 2A. However, the ground conductor bent portion 22 may extend in such a manner as to curve from the ground conductor main body portion 21. Further, in the patch antenna 10 of an embodiment of the present disclosure, the ground conductor bent portion 22 has a structure of bending (curving) once from the ground conductor main body portion 21, as illustrated in FIG. 2A. However, the ground conductor bent portion 22 may have a structure of bending (curving) a plurality of times from the ground conductor main body portion 21.

In the patch antenna 10 of an embodiment of the present disclosure, as illustrated in FIG. 2B, both the width (the length in the Y direction) of the ground conductor 20 and the width of the radiating element 30 are the same. However, the width of the ground conductor 20 may be longer than the width of the radiating element 30, or the width of the radiating element 30 may be longer than the width of the ground conductor 20.

Further, in the patch antenna 10 of an embodiment of the present disclosure, each the ground conductor bent portions 22 extends from the ground conductor main body portion 21 toward the radiating element 30, as illustrated in FIGS. 1 and 2A. That is, the ground conductor bent portions 22 extend in the direction of radiation. In other words, in a side view of the patch antenna 10 viewed from the Y direction illustrated in FIG. 2A, the ground conductor 20 is structured to be recessed in the direction of radiation. Further, an opening formed with the end part of the ground conductor 20 and the end part of the radiating element 30 results in being directed toward the direction of radiation.

This results in wave sources 11 (strong electric field regions) generated at the end parts of the ground conductor 20 and the radiating element 30 being positioned more to the side of the direction of radiation, as illustrated in FIGS. 2A and 2B. Further, the ground conductor 20 (ground conductor main body portion 21) having conductivity is located on the −Z direction side relative to the wave sources 11 (the side opposite to the direction of radiation), which results in suppression of the radiation of radio waves to the side opposite to the direction of radiation.

In this way, in the patch antenna 10 of an embodiment of the present disclosure, the ground conductor bent portions 22 are formed by bending from the end parts of the ground conductor main body portion 21, thereby being able to reduce the size of the ground conductor 20 in the X direction. That is, in the patch antenna 10 of an embodiment of the present disclosure, it is possible to downsize the patch antenna. Then, by extending the ground conductor bent portions 22 from the ground conductor main body portion 21 toward the radiating element 30 and positioning the wave sources 11 more to the side of the direction of radiation, it is possible to suppress the reduction in the gain in the direction of radiation. Accordingly, in an embodiment of the present disclosure, it is possible to downsize the patch antenna 10 and suppress the reduction in the gain in the direction of radiation.

As described above, in the patch antenna 10 of an embodiment of the present disclosure, the outer conductor connection portion 23 is provided at the back surface of the ground conductor main body portion 21, as illustrated in FIG. 2A, and the inner conductor connection portion 34 is provided at the back surface of the radiating element 30. This results in a feeder (not illustrated) being provided on the side opposite to the direction of radiation of the patch antenna 10. Accordingly, with the feeding structure of the patch antenna 10, which is constituted by the outer conductor connection portion 23 and the inner conductor connection portion 34, being provided on the back surface side of the patch antenna 10 (on the side opposite to the direction of radiation), it is possible to suppress the influence of the feeder on the patch antenna 10. That is, it is possible to increase the degree of freedom in the arrangement of the feeder in the patch antenna 10.

Incidentally, such a patch antenna as the patch antenna 10A of a comparative example described above in which both the ground conductor 20A and the radiating element 30A are formed of the plate-shaped members, has a high gain in the direction normal to the radiating element 30A. However, such a patch antenna as the patch antenna 10A of a comparative example has a narrow half power angle. As illustrated in FIG. 3A, when the +Z direction is set as the azimuth angle $\varphi=0°$, the +Y direction is set as the azimuth angle $\varphi=90°$, and the +X direction is set as the angle $\theta=0°$, the gain is at its peak in the direction normal to the plate surface of the radiating element 30A (direction of radiation: $\theta=90°$, $\varphi=0°$. As the angle $\theta$ decreases and the azimuth angle $\varphi$ increases, the gain suddenly decreases. Here, the half-power angle refers to the directivity angle at which the gain is from its peak value to −3 dB. For example, when the patch antenna 10A is used for V2X, it is necessary to widen the range of radiation angle. Thus, such a patch antenna as the patch antenna 10A of a comparative example may be at a disadvantage when receiving or transmitting radio waves in a wide range of radiation angle.

The patch antenna 10 of an embodiment of the present disclosure is capable of widening the half-power angle by reducing the width (the length in the Y direction) of at least one of the ground conductor 20 or the radiating element 30. This is because the leakage of radio waves in the direction of radiation ($\theta=90°$) is suppressed by reducing the width of at least one of the ground conductor 20 and the radiating element 30, meanwhile, the leakage of radio waves propagating in the Y direction ($\theta=90°$, $\varphi=+90°$) increases. That is, the patch antenna 10 of an embodiment of the present disclosure can easily adjust the half-power angle by simply changing the size of the element (at least one of the ground conductor 20 or the radiating element 30) of the antenna.

In the patch antenna 10 of an embodiment of the present disclosure, there is no need to expand radiation in the horizontal direction (e.g., the Y direction) with the provision of a waveguide in the horizontal direction, and suppress radiation in the vertical direction (e.g. in the X direction) with the provision of a conducting wall in the vertical radiation. That is, the half-power angle can be adjusted by reducing the width of the element(s), without additionally providing another member to thereby adjust the half-power angle. Thus, according to the patch antenna 10 of an embodiment of the present disclosure, it is possible to downsize the patch antenna 10 and easily adjust the half-power angle.

It has already been described that the inclination angle of the ground conductor bent portion 22 with respect to the plate surface of the ground conductor main body portion 21 may be an obtuse angle or an acute angle. The more obtuse the angle of inclination of the ground conductor bent portion 22 with respect to the plate surface of the ground conductor main body portion 21 is, the narrower the half-power angle becomes, and the more acute the angle of inclination thereof is, the wider the half-power angle becomes. Accordingly, this also makes it possible to easily adjust the half-power angle.

In the patch antenna 10 of an embodiment of the present disclosure, the ground conductor main body portion 21 included in the ground conductor 20, which is the first element, is referred to as "first main body portion," and the ground conductor bent portion 22 is referred to as "first bent portion".

The configuration of the patch antenna is not limited to the case of the patch antenna 10 illustrated in FIGS. 1 to 2B. As will be described later, the patch antenna may have a slit formed in an element, or may have a dielectric between the ground conductor and the radiating element.

First Modification Example

Figure 4:
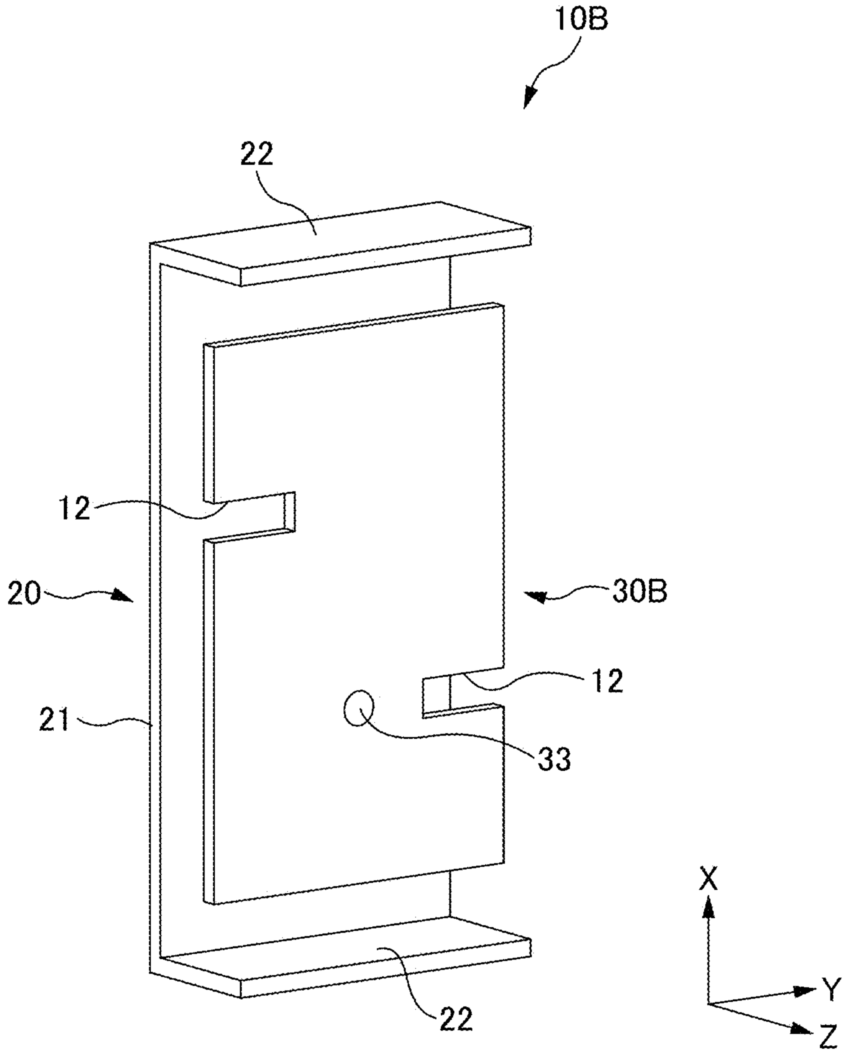
FIG. 4 is a perspective view of a patch antenna 10B of a first modification example.

FIG. 4 is a perspective view of the patch antenna 10B of a first modification example.

In the patch antenna 10B of this modification example, slits 12 are formed in the radiating element 30B. This makes it possible to change the transmission line of the radiating element 30B to increase the electrical length of the radiating element 30B. Then, with an increase in the electrical length of the radiating element 30B, the resonance frequency can be lowered (to the low frequency side). Further, for example, the radiating element 30B can be fixed to a case (not illustrated) by fitting, in the slit 12, a protrusion such as a claw member formed at the case. That is, this negates the need for another member to fix the radiating element 30B to the case, thereby being able to further downsize the patch antenna 10B.

In the patch antenna 10B of this modification example, two slits 12 are formed in the radiating element 30B, as illustrated in FIG. 4. However, the number of slits 12 and the element in which the slits 12 are formed are not limited to those illustrated in FIG. 4. For example, the radiating element 30B may have one slit 12 or three or more slits 12 formed therein. Further, the slit(s) 12 may be formed in the ground conductor 20 instead of the radiating element 30B, or the slits 12 may be formed in both the radiating element 30B and the ground conductor 20. When the slit(s) 12 is/are formed in the ground conductor 20, the slit(s) 12 is/are formed in at least one of the ground conductor main body portion 21 or the ground conductor bent portion 22.

Further, in the patch antenna 10B of this modification example, the slits 12 are linearly formed, as illustrated in FIG. 4. However, the shape of the slits 12 is not limited to that illustrated in FIG. 4. For example, the slits 12 each may have a bent portion or a curved portion, thereby being formed into a curved shape. In the patch antenna 10B of this modification example, the slits 12 only have to be provided such that at least one of reception or transmission of the radio waves of the desired frequency band can be performed more appropriately than in the case where no slit 12 is provided.

Second Modification Example

Figure 5:
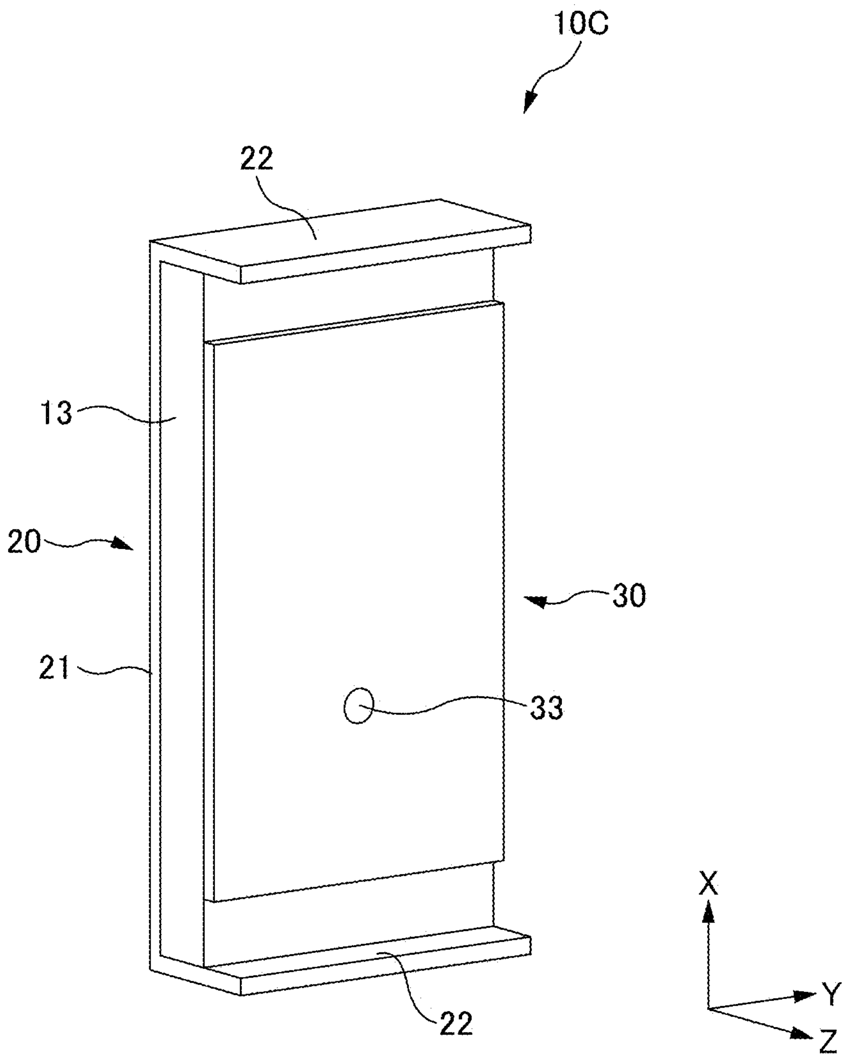
FIG. 5 is a perspective view of a patch antenna 10C of a second modification example.

FIG. 5 is a perspective view of the patch antenna 10C of a second modification example.

The patch antenna 10C of this modification example includes a dielectric 13. The dielectric 13 is a member arranged between the ground conductor 20 and the radiating element 30, as illustrated in FIG. 5. The dielectric 13 may be made of ABS resin that is the same as of the case not illustrated or may be made of ceramic, for example. That is, in an embodiment of the present disclosure, the dielectric 13 is formed of a dielectric material. With the dielectric 13 being arranged between the ground conductor 20 and the radiating element 30, the distance between the ground conductor 20 and the radiating element 30 can be maintained. Further, with the use of the dielectric 13 having a high dielectric constant, it is possible to achieve an effect of reduction in wavelength due to the dielectric constant of the dielectric, and further downsize the patch antenna 10C.

In the patch antenna 10C of this modification example, as illustrated in FIG. 5, the dielectric 13 is provided between the front surface of the ground conductor main body portion 21 of the ground conductor 20 and the back surface of the radiating element 30. However, the location at which the dielectric 13 is provided is not limited to the case of FIG. 5. For example, the dielectric 13 may be further provided between the ground conductor bent portion 22 of the ground conductor 20 and the end part of the radiating element 30, or may be provided between the front surface of the ground conductor main body portion 21 of the ground conductor 20 and the back surface of the radiating element 30, and in at least a portion between the ground conductor bent portion 22 of the ground conductor 20 and the end part of the radiating element 30. The dielectric 13 may be, for example, a spacer, a holding portion, or the like.

In the patch antenna 10 of the first embodiment described above, the ground conductor 20 is located on the −Z direction side (the side opposite to the direction of radiation), and the radiating element 30 is located on the +Z direction side (the side opposite to the direction of radiation). However, as will be described later, the positional relationship between the ground conductor 20 and the radiating element 30 in the Z direction may be different. That is, the ground conductor 20 and the radiating element 30 may be located at any positions, as long as they are held by the case not illustrated and the like and at least one of reception or transmission of the radio waves of the desired frequency band can be performed.

Second Embodiment

Figure 6A:
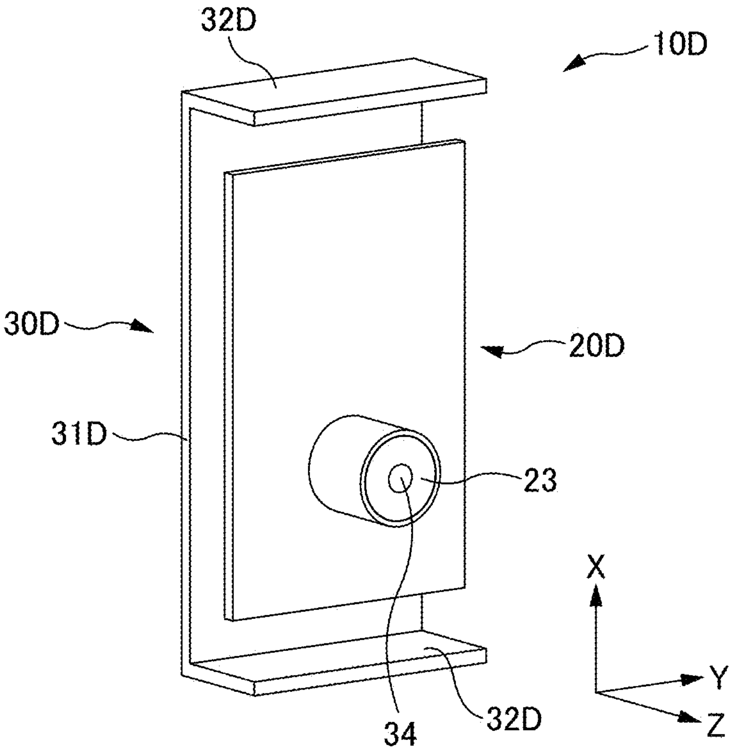
FIG. 6A is a perspective view of a patch antenna 10D of a second embodiment.
Figure 6B:
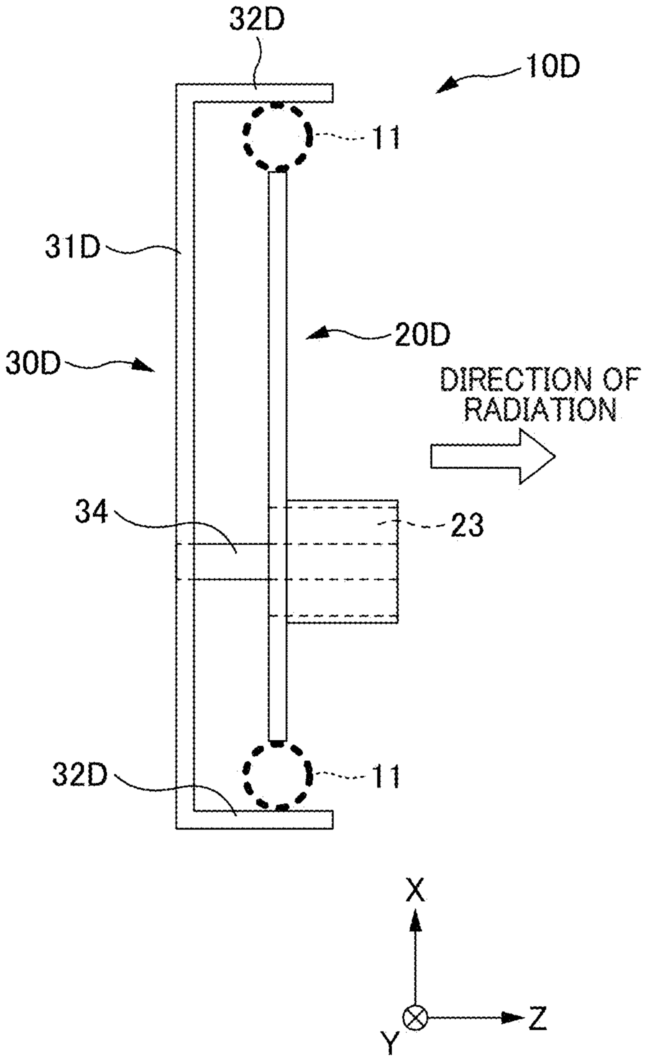
FIG. 6B is a side view of a patch antenna 10D of a second embodiment.

FIG. 6A is a perspective view of a patch antenna 10D of a second embodiment, and FIG. 6B is a side view of the patch antenna 10D of the second embodiment.

In the patch antenna 10D of an embodiment of the present disclosure, the positions of the ground conductor and the radiating element have been switched, as compared to the patch antenna 10 of the first embodiment. That is, in the patch antenna 10D of an embodiment of the present disclosure, the outer conductor (not illustrated) of the feeder is connected to the element on the +Z direction side, and the inner conductor (not illustrated) of the feeder is connected to the element on the −Z direction side. As a result, the patch antenna 10D of an embodiment of the present is configured, as illustrated in FIGS. 6A and 6B, such that the element on the +Z direction side (on the side in the direction of radiation) is a ground conductor 20D and the element on the −Z direction side (on the side opposite to the direction of radiation) is a radiating element 30D.

In the patch h antenna 10D of an embodiment of the present disclosure, the ground conductor 20D is located so as to face the radiating element 30D, as illustrated in FIGS. 6A and 6B. Further, the ground conductor 20D is located on the +Z direction side with respect to the radiating element 30D. The ground conductor 20D is located on the +Z direction side relative to the radiating element 30D. Further, in an embodiment of the present disclosure, the ground conductor 20D is made of a metal plate-shaped member (metal plate) in a substantially quadrilateral shape. The ground conductor 20D includes the outer conductor connection portion 23 to which the outer conductor (not illustrated) of the feeder is connected. The outer conductor connection portion 23 is provided on the front surface (the surface on the +Z direction side) of the ground conductor 20D, as illustrated in FIGS. 6A and 6B.

In the patch antenna 10D of an embodiment of the present disclosure, as illustrated in FIGS. 6A and 6B, the radiating element 30D includes radiating element main body portion 31D and radiating element bent portions 32D.

The radiating element main body portion 31D is a part of the radiating element 30D formed as a metal plate-shaped member (metal plate). The radiating element main body portion 31D includes the inner conductor connection portion 34 to which the inner conductor (not illustrated) of the feeder is connected. The inner conductor connection portion 34 is provided at the front surface (the surface on the +Z direction side) of the radiating element 30D, as illustrated in FIG. 6B.

Each of the radiating element bent portions 32D is a part extending from the radiating element main body portion 31D. In an embodiment of the present disclosure, the radiating element bent portion 32D is formed by bending from the end part of the radiating element main body portion 31D formed of a metal plate. However, the radiating element bent portion 32D may be a metal plate separate from the radiating element main body portion 31D, and may be connected (joined) so as to extend from the end part of the radiating element main body portion 31D.

Note that a configuration may be such that each of the radiating element main body portion 31D and the radiating element bent portion 32D is formed of the conductive pattern provided at the substrate, without being formed of a metal plate, and the radiating element main body portion 31D and the radiating element bent portion 32D are electrically connected. Further, a configuration may also be such that the radiating element main body portion 31D is formed of the conductive pattern provided at the substrate, the radiating element bent portion 32D is formed of a metal plate, and the radiating element main body portion 31D and the radiating element bent portion 32D are electrically connected. Alternatively, a configuration may be such that the radiating element main body portion 31D is formed of a metal plate, the radiating element bent portion 32D is formed of the conductive pattern provided at the substrate, and the radiating element main body portion 31D and the radiating element bent portion 32D are electrically connected. The substrate may be a dielectric substrate such as a printed circuit board and the like, or may be a substrate made of resin and the like.

When the radiating element main body portion 31D and the radiating element bent portion 32D are formed of the conductive pattern provided at the substrate formed of resin and the like, the above-described MID technology can be used. This makes it possible, for example, to form the conductive pattern at resin having such shapes as the radiating element main body portion 31D and the radiating element bent portion 32D illustrated in FIGS. 6A and 6B, or to make a configuration such that the radiating element bent portion 32D is formed, using the MID technology, at a casing made of resin and the like, to thereby be electrically connected to the radiating element main body portion 31D that is separate therefrom.

Further, when the radiating element main body portion 31D and the radiating element bent portion 32D are formed of the conductive patterns provided at the substrate, the radiating element main body portion 31D and the radiating element bent portion 32D may be integrally formed of a flexible substrate.

Explanations of the number of the radiating element bent portions 32D, the inclination angle with respect to the radiating element main body portion 31D, and other characteristics of the patch antenna 10D are the same as of the patch antenna 10 in the first embodiment, and thus are omitted.

Further, the outer conductor connection portion 23 to connect the outer conductor of the feeder to the ground conductor 20D, and the inner conductor connection portion 34 to connect the inner conductor of the feeder to the radiating element 30D are provided at the ground conductor 20D on the +Z direction side. That is, the feeder not illustrated results in being provided at the patch antenna 10D on the side of the direction of radiation. Accordingly, the influence of the feeder on the patch antenna 10D is greater than that on the patch antenna 10 of the first embodiment. However, if such an influence can be tolerated, the patch antenna 10D of the second embodiment can also downsize the patch antenna 10D and suppress the reduction in the gain of the direction of radiation.

In the patch antenna 10D of an embodiment of the present disclosure, the ground conductor 20D is arranged on the side of the direction of radiation of the patch antenna 10D, and the radiating element 30D is arranged on the side opposite to the direction of radiation of the patch antenna 10D. Thus, the radiating element 30D is the first element, and the ground conductor 20D is the second element.

Further, in the patch antenna 10D of an embodiment of the present disclosure, the radiating element main body portion 31D included in the radiating element 30D, which is the first element, is referred to as “first main body portion” and the radiating element bent portion 32D is referred to as “first bent portion”.

In the patch antenna 10 of the first embodiment and the patch antenna 10D of the second embodiment described above, the element (first element) on the side opposite to the direction of radiation of the patch antenna 10 includes components of the first main body portion and the first bent portion. That is, the patch antenna 10 of the first embodiment includes the ground conductor main body portion 21 and the ground conductor bent portions 22, and the patch antenna 10D of the second embodiment includes the radiating element main body portion 31D and the radiating element bent portions 32D. However, as will be described later, the element (second element) on the side of the direction of radiation of the patch antenna 10 may also have the same configuration as the first element.

Third Embodiment

FIG. 7 is a perspective view of a patch antenna 10E of the first embodiment. FIG. 8A is a side view of the patch antenna 10E of the third embodiment, and FIG. 8B is a front view of the patch antenna 10E of the third embodiment.

In the patch antenna 10E of an embodiment of the present disclosure, the ground conductor 20 includes the ground conductor main body portion 21 and the ground conductor bent portions 22, as in the patch antenna 10 of the first embodiment illustrated in FIGS. 1 to 2B. Further, in the patch antenna 10E of an embodiment of the present disclosure, as illustrated in FIGS. 7 to 8B, the radiating element 30E includes the radiating element main body portion 31E and radiating element bent portions 32E, unlike the patch antenna 10 of the first embodiment. Note that explanations of the number of the radiating element bent portions 32E and other characteristics of the patch antenna 10E are the same as of the patch antenna 10D of the second embodiment, and thus are omitted.

In the patch antenna 10E of an embodiment of the present disclosure, each radiating element bent portion 32E extends at an inclination angle of 90° with respect to the plate surface of the radiating element main body portion 31E, as illustrated in FIG. 8A. However, the inclination angle of the radiating element bent portion 32E with respect to the plate surface of the radiating element main body portion 31E may be an obtuse angle or an acute angle.

Furthermore, in the patch antenna 10E of an embodiment of the present disclosure, at least either one of the ground conductor bent portion 22 or the radiating element bent portion 32E may be inclined with respect to the plate surface of the ground conductor main body portion 21 or the radiating element main body portion 31E such that the ground conductor bent portion 22 and the radiating element bent portions 32E will be positioned close to each other. Further, in the patch antenna 10E of an embodiment of the present disclosure, at least either one of the ground conductor bent portion 22 or the radiating element bent portion 32E may be inclined with respect to the plate surface of the ground conductor main body portion 21 or the radiating element main body portion 31E such that the ground conductor bent portion 22 and the radiating element bent portion 32E will be positioned away from each other.

In the patch antenna 10E of an embodiment of the present disclosure, the ground conductor 20 is arranged on the side opposite to the direction of radiation of the patch antenna 10E, and the radiating element 30E is arranged on the side of the direction of radiation of the patch antenna 10E. Thus, the ground conductor 20 is the first element, and the radiating element 30E is the second element.

Further, in the patch antenna 10E of an embodiment of the present disclosure, the ground conductor main body portion 21 included in the ground conductor 20, which is the first element, is referred to as “first main body portion” and the ground conductor bent portion 22 is referred to as “first bent portion”. Further, the radiating element main body portion 31E included in the radiating element 30E, which is the second element, is referred to as “second main body portion”, and the radiating element bent portion 32E is referred to as “second bent portion”.

<<Relationship Between Various Dimensions and Antenna Characteristics of Patch Antenna 10E>>

The following describes the relationship between various dimensions and antenna characteristics in the patch antenna 10E of an embodiment of the present disclosure. First, various dimensions of the patch antenna 10E will be explained with reference to FIGS. 9A and 9B.

Figure 9A:
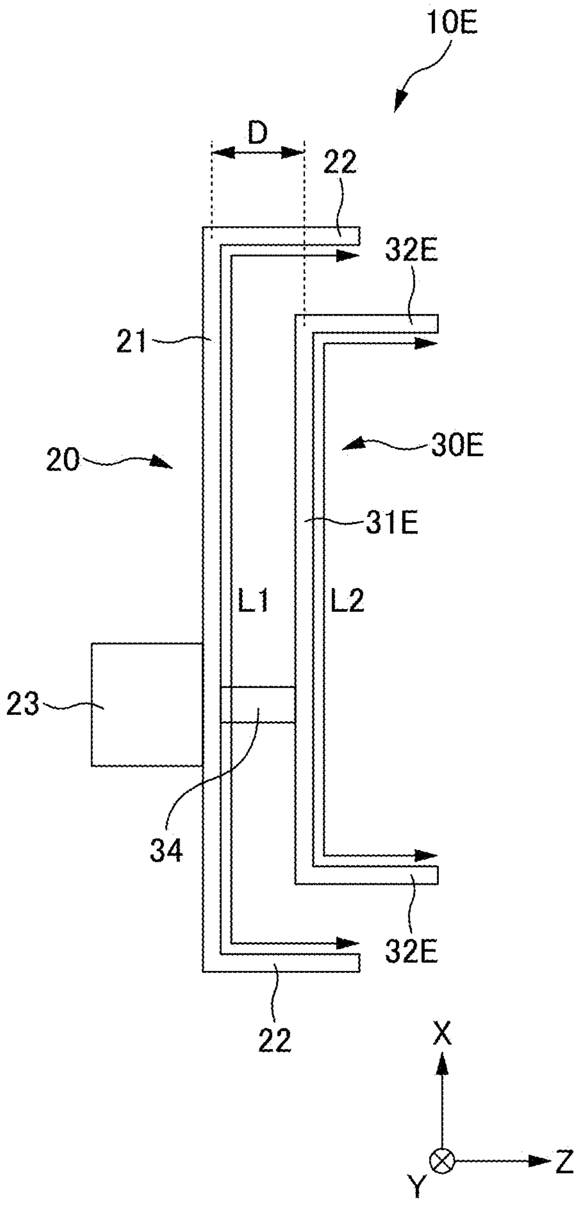
FIG. 9A is an explanatory diagram illustrating various dimensions of a side surface of a patch antenna 10E according to a third embodiment.
Figure 9B:
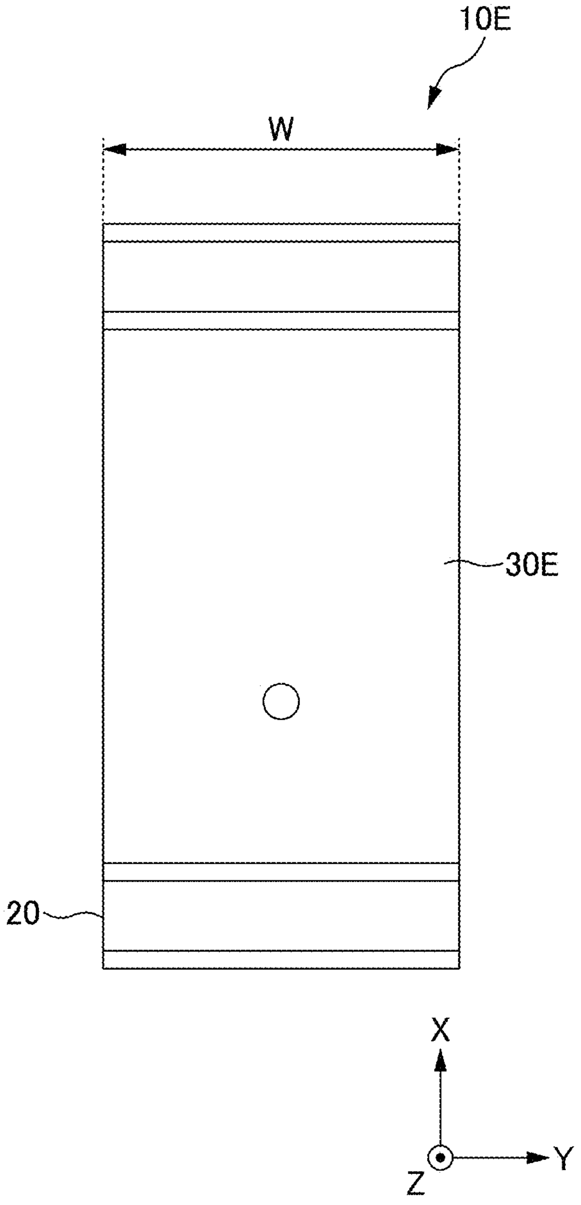
FIG. 9B is an explanatory diagram illustrating various dimensions of a front surface of a patch antenna 10E according to a third embodiment.

FIG. 9A is an explanatory diagram illustrating various dimensions of a side surface of the patch antenna 10E according to the third embodiment, and FIG. 9B is an explanatory diagram illustrating various dimensions of a front surface of the patch antenna 10E according to the third embodiment.

As illustrated in FIG. 9A, L1 is the electrical length of the ground conductor 20. Here, the electrical length L1 is a length determined by the path length of the element (here, the ground conductor 20) and the wavelength. Further, the path length is the length from the end part of the ground conductor bent portion 22 on the +X direction side to the end part of the ground conductor bent portion 22 on the −X direction side through the ground conductor main body portion 21. The following describes, assuming that the electrical length is the same as the path length, for convenience. Further, L2 is the electrical length of the radiating element 30E. That is, L2 is the path length from the end part of the radiating element bent portion 32E on the +X direction side to the end part of the radiating element bent portion 32E on the −X direction side through the radiating element main body portion 31E.

Further, as illustrated in FIG. 9A, D is the distance between the ground conductor 20 and the radiating element 30E. That is, the distance D is the distance between the ground conductor main body portion 21 of the ground conductor 20 and the radiating element main body portion 31E of the radiating element 30E. Specifically, the distance D is the distance between the front surface of the ground conductor main body portion 21 of the ground conductor 20 and the back surface of the radiating element main body portion 31E of the radiating element 30E. That is, the distance D is the shortest distance between the elements (the ground conductor 20 and the radiating element 30E) of the patch antenna 10E.

Further, as illustrated in FIG. 9B, W is the width of the ground conductor 20 and the radiating element 30E.

Further, X is the difference between the electrical length L1 of the ground conductor 20 and the electrical length L2 of the radiating element 30E. Here, X is the value (L2−L1) obtained by subtracting the electrical length L1 of the ground conductor 20 from the electrical length L2 of the radiating element 30E. Accordingly, this means that when X is larger than 0, the electrical length L2 of the radiating element 30E is longer than the electrical length L1 of the ground conductor 20, and when X is smaller than 0, the electrical length L1 of the ground conductor 20 is longer than the electrical length L2 of the radiating element 30E.

In the patch antenna 10E of an embodiment of the present disclosure, both the electrical length L1 of the ground conductor 20 and the electrical length L2 of the radiating element 30E are set to nearly a half of the wavelength in the frequency band of radio waves supported by the patch antenna 10E. Specifically, in an embodiment of the present disclosure, the target frequency is adjusted to 5.8875 GHz, and thus the electrical length L1 of the ground conductor 20 and the electrical length L2 of the radiating element 30E are set to 25.5 mm, for example. That is, the wavelength of the transmission line in the patch antenna 10E is substantially a half of the wavelength in the frequency band of supported radio waves.

Figure 10:
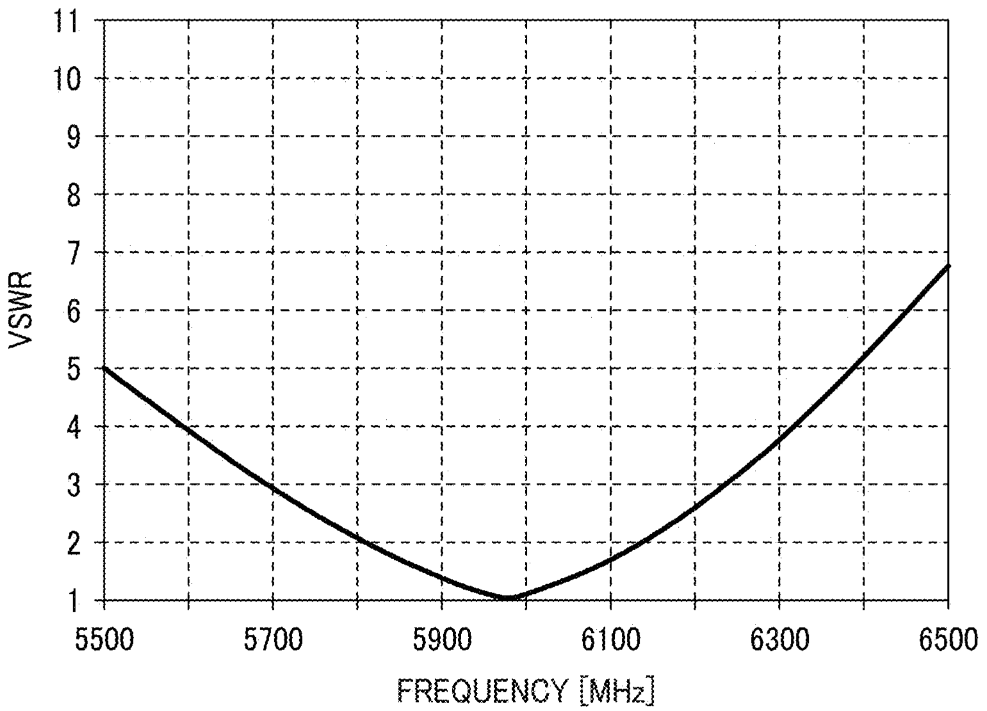
FIG. 10 is a diagram illustrating frequency characteristics of VSWR of a patch antenna 10E.
Figure 11:
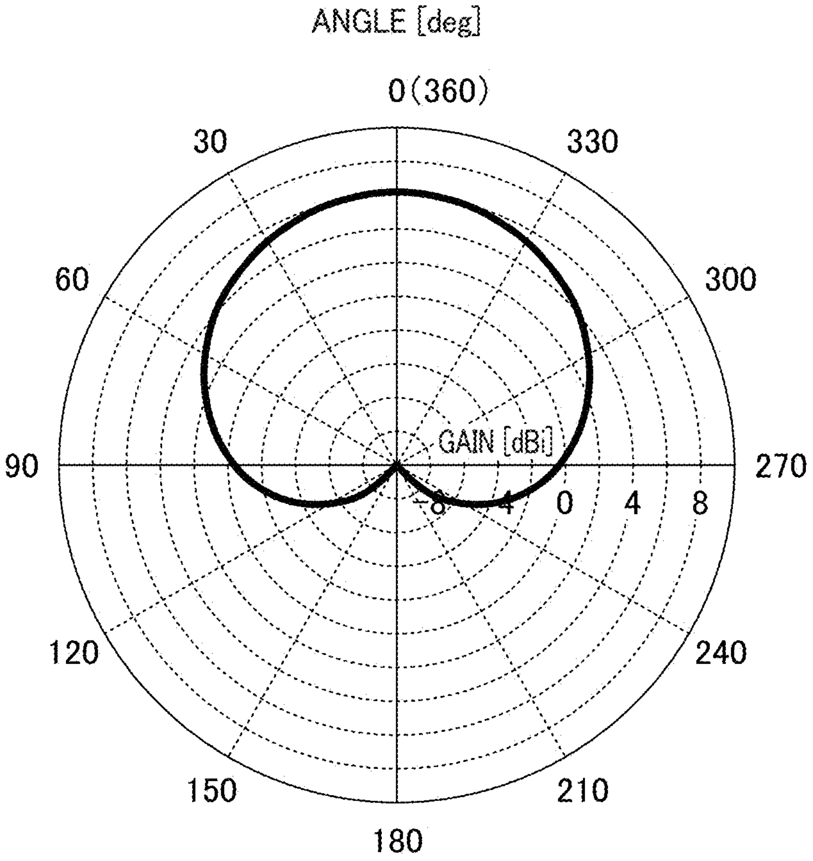
FIG. 11 is a diagram illustrating directivity in a YZ plane of a patch antenna 10E.

FIG. 10 is a diagram illustrating the frequency characteristics of the VSWR of the patch antenna 10E. FIG. 11 is a diagram illustrating the directivity on the YZ plane of the patch antenna 10E.

In FIG. 10, the horizontal axis represents frequency and the vertical axis represents voltage standing wave ratio (VSWR). As illustrated in FIG. 10, the patch antenna 10E has good VSWR characteristics around 5.9 GHz. In addition, as illustrated in FIG. 11, the gain is highest at an angle of 0°, and the directivity angles from the peak value of the gain to −3 dB are from 0° to 60° and from 300° to 360°, and thus the patch antenna 10E is able to ensure a half-power angle of around 120°.

Figure 12:
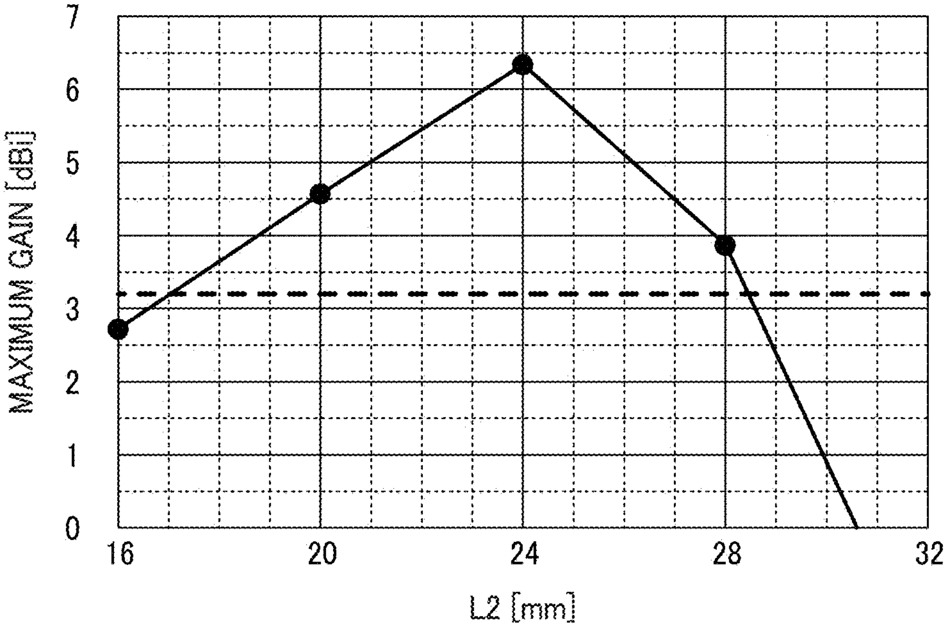
FIG. 12 is a diagram illustrating a relationship between an electrical length L2 of a radiating element 30E and the maximum gain in a YZ plane.

FIG. 12 is a diagram illustrating the relationship between the electrical length L2 of the radiating element 30E and the maximum gain in the YZ plane.

In FIG. 12, the horizontal axis represents the electrical length L2 of the radiating element 30E, and the vertical axis represents the maximum gain in the YZ plane. An example of the maximum gain in the YZ plane when the electrical length L2 of the radiating element 30E changes from 16 mm to 32 mm is given as a graph. Here, the electrical length L1 of the ground conductor 20 changes with the electrical length L2 of the radiating element 30E. That is, assuming that the difference X between the electrical length L1 of the ground conductor 20 and the electrical length L2 of the radiating element 30E is −4 mm, the electrical length L1 of the ground conductor 20 is changed from 20 mm to 36 mm.

Here, in this verification, standard is that the range of the communication area of the patch antenna 10E of an embodiment of the present disclosure is set so as to fall within the half-power angle. That is, the case in which the maximum gain exceeds half (−3 dBi) of the optimum value is set as the allowable range in the patch antenna 10E. In other words, the case in which the maximum gain is less than a half of the optimal value (−3 dBi) results in being not acceptable, as the range of the communication area not falling within the half-power angle. In the graph given in FIG. 12, when L2=24 mm, the maximum gain is around 6 dBi and the value of 3 dBi, which is the standard of the half-power angle, is given by a dashed line.

As illustrated in FIG. 12, in the patch antenna 10E, the electrical length L2 of the radiating element 30E that can secure the half-power angle is in the range of 17 mm to 28.5 mm. Here, the range of 17 mm to 28.5 mm corresponds to a quarter or more and a half or less of the wavelength of the frequency band of radio waves supported by the patch antenna 10E. Accordingly, with the electrical length L2 of the radiating element 30E of the patch antenna 10E being set to a quarter or more and a half or less of the wavelength of the frequency supported by the patch antenna 10E, it is possible to perform at least one of reception or transmission of radio waves in a wide range of angle.

Figure 13:
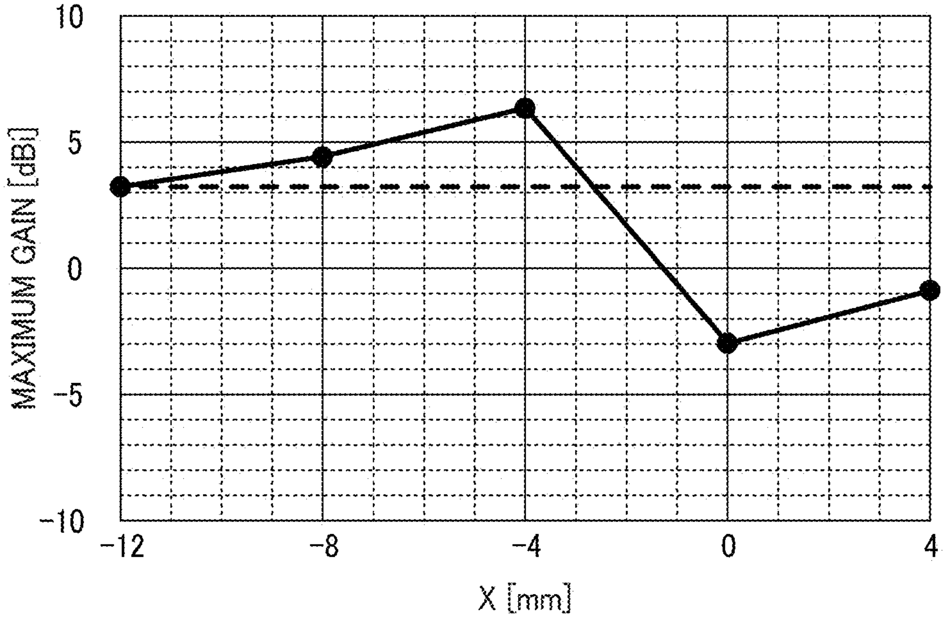
FIG. 13 is a diagram illustrating a relationship between the maximum gain in a YZ plane and a difference X between an electrical length L1 of a ground conductor 20 and an electrical length L2 of a radiating element 30E.

FIG. 13 is a diagram illustrating the relationship between the maximum gain in the YZ plane and the difference X between the electrical length L1 of the ground conductor 20 and the electrical length L2 of the radiating element 30E.

In FIG. 13, the horizontal axis represents the difference X between the electrical length L1 of the ground conductor 20 and the electrical length L2 of the radiating element 30E, and the vertical axis represents the maximum gain in the YZ plane. An example of the maximum gain in the YZ plane when the difference X between the electrical length L1 of the ground conductor 20 and the electrical length L2 of the radiating element 30E is changed from −12 mm to 4 mm is given as a graph.

Here, in this verification as well, that is, the case in which the maximum gain exceeds a half (−3 dBi) of the optimal value is set as the allowable range in the patch antenna 10E. In the graph given in FIG. 12, when X=−4 mm, the maximum gain is around 6 dBi, and the value of 3 dBi, which is the standard of the half-power angle, is given by a dashed line.

As illustrated in FIG. 13, in the patch antenna 10E, the difference X between the electrical length L1 of the ground conductor 20 and the electrical length L2 of the radiating element 30E is in the range of −12 mm to −2.5 mm. Here, the range of −12 mm to −2.5 mm corresponds to one sixteenth or more and a quarter or less of the wavelength in the frequency band of radio waves supported by the patch antenna 10E. Accordingly, in the patch antenna 10E, with the electrical length L1 of the ground conductor 20 being set longer than the electrical length L2 of the radiating element 30E, as well as the difference X between the electrical length L1 of the ground conductor 20 and the electrical length L2 of the radiating element 30E being set to one sixteenth or more and a quarter or less of the wavelength of the frequency supported by the patch antenna 10E, it becomes s possible to perform at least one of reception or transmission of radio waves in a wide range of angle.

Figure 14:
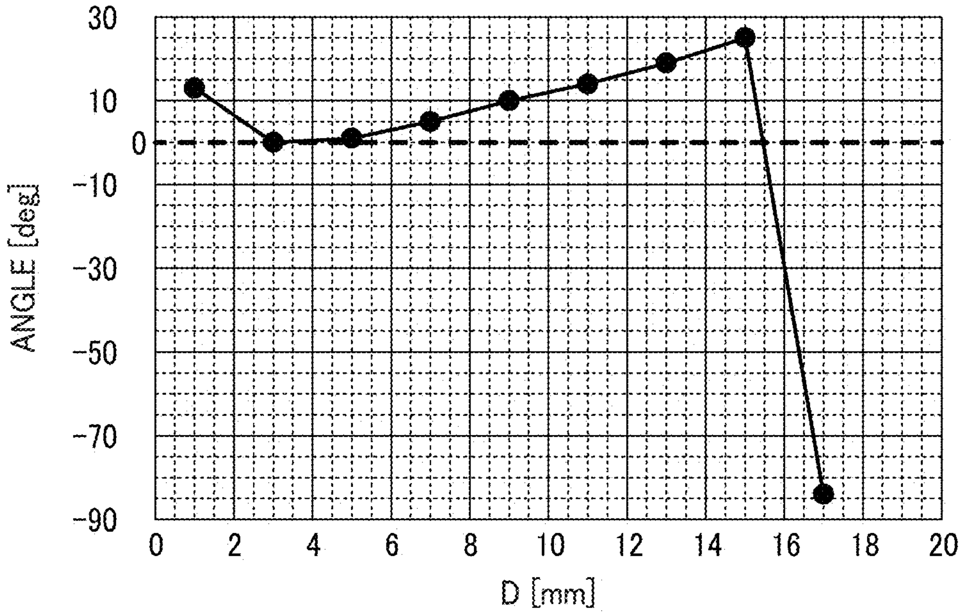
FIG. 14 is a diagram illustrating a relationship between a main lobe angle and a distance D between a ground conductor 20 and a radiating element 30E.

FIG. 14 is a diagram illustrating the relationship between a main lobe angle and the distance D between the ground conductor 20 and the radiating element 30E.

In FIG. 14, the horizontal axis represents the distance D between the ground conductor 20 and the radiating element 30E, and the vertical axis represents the main lobe angle. Here, the main lobe angle refers to the angle at which the gain is at its peak value, with 0° being in the +Z direction (the direction of radiation) and 90° being in a direction parallel to the XY plane. An example of the main lobe angle when the distance D between the ground conductor 20 and the radiating element 30E is changed from 1 mm to 20 mm is given as a graph.

Here, in this verification, the case in which the main lobe angle is within a range of a predetermined angle relative to the direction of radiation, here, the case in which the main lobe angle is within a range of ±30°, is set as the allowable range of the patch antenna 10E. In the graph given in FIG. 12, the value at which the main lobe angle is 0° (the +Z direction; the direction of radiation) is given by the dashed line.

As illustrated in FIG. 14, in the patch antenna 10E, the distance D between the ground conductor 20 and the radiating element 30E, where the main lobe angle is within the range of ±30°, is in a range up to 16 mm. Here, 16 mm corresponds to a quarter of the wavelength in the frequency band of radio waves supported by the patch antenna 10E. Accordingly, in the patch antenna 10E, with the distance D between the ground conductor 20 and the radiating element 30E being set to a quarter or less, it becomes possible to perform at least one of reception and transmission of radio waves in a wide range of angle.

==Antenna Device 60==

Figure 15:
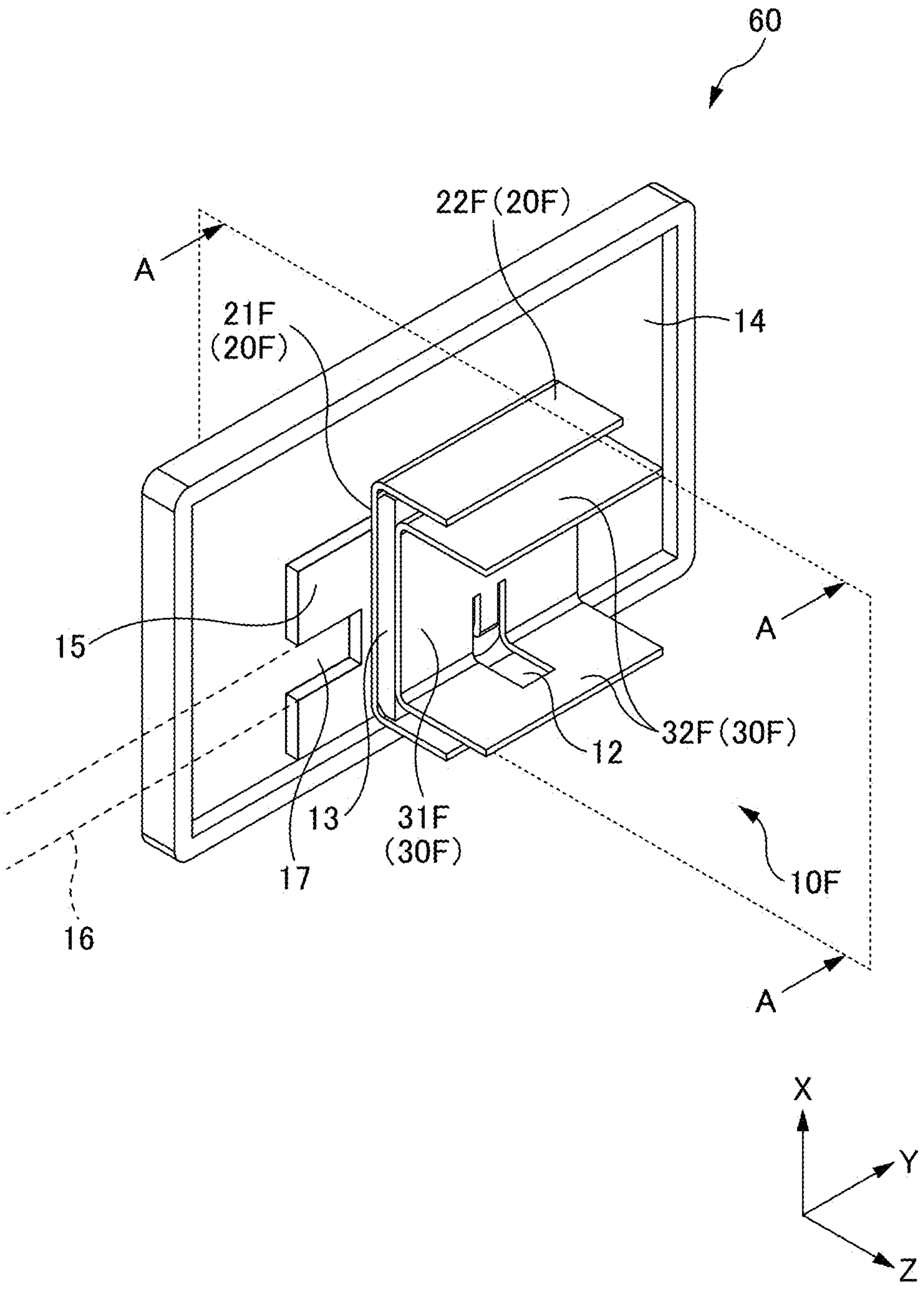
FIG. 15 is a perspective view of an antenna device 60.
Figure 16:
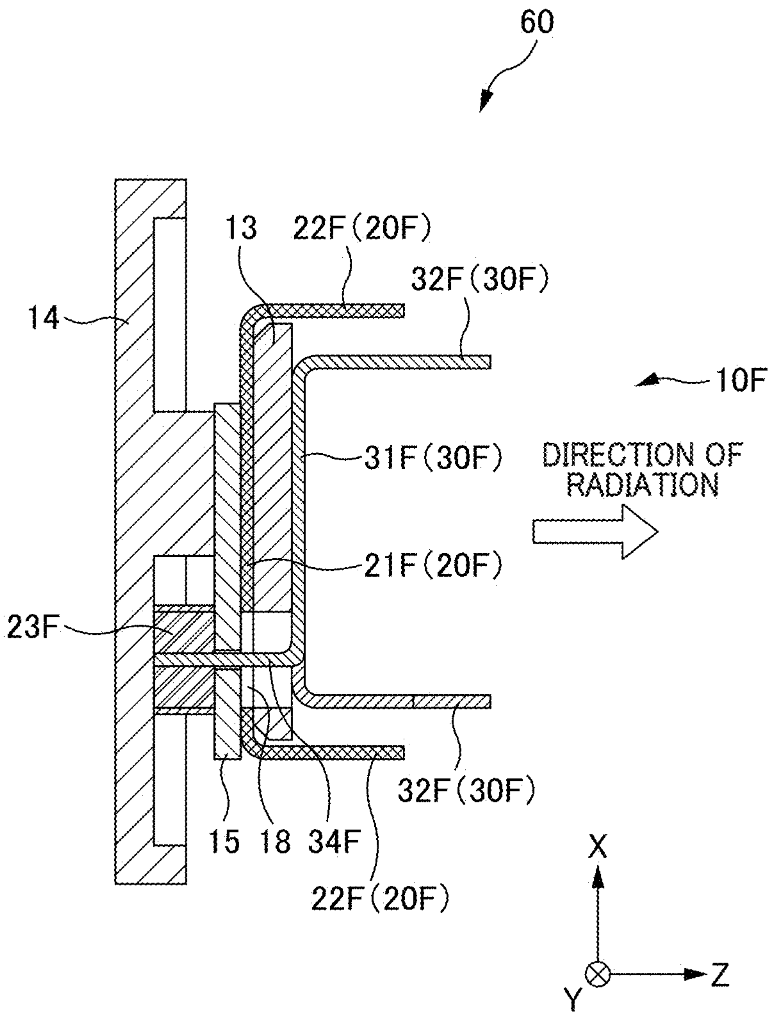
FIG. 16 is a cross-sectional view of an antenna device 60 taken along an A-A plane.

FIG. 15 is a perspective view of an antenna 60. FIG. 16 is a cross-sectional view of the antenna device 60 taken along an A-A plane. In FIGS. 15 and 16, part of a case 14 (described later) on the +Z direction side is omitted in order to illustrate the internal configuration of the antenna device 60.

The antenna device 60 is mounted in a predetermined direction at a predetermined position of a vehicle that is not illustrated, and is connected to a device, such as a V2X controller, through a coaxial cable including a feeder 16. The antenna device 60 is mounted at the upper part of a windshield (for example, around a rearview mirror) inside the vehicle such that the direction of radiation (+Z direction) of the patch antenna 10 is directed forward, which is the forward direction of the vehicle, the +Y direction is directed to the left when facing the forward direction of the vehicle, and the −Y direction is directed to the right when facing the forward direction of the vehicle.

However, the mounting position and/or direction of mounting of the antenna device 60 may be changed as appropriate depending on an environmental condition such as an assumed target of communication. The antenna device 60 can be mounted to the vehicle at a position, such as a roof, an upper part of a dashboard, a bumper, a mounting part of a license plate, a pillar part, a spoiler part, or the like. Further, the antenna device 60 may be mounted at a rear window inside the vehicle such that the direction of radiation of the patch antenna is directed rearward, which is the rear direction of the vehicle. Further, the antenna device 60 may be mounted such that the direction of radiation of the patch antenna is directed to the left or right of the vehicle. The antenna device 60 can also be mounted on the roof of the vehicle when it has a structure ensuring waterproof and dustproof performance conditions.

The antenna device 60 includes the case 14, a patch antenna 10F, and a substrate 15, as illustrated in FIGS. 15 and 16.

The case 14 is a member forming the exterior of the antenna device 60. The case 14 is formed of insulating resin such as ABS resin. However, the case 14 may be made of a material other than insulating resin, such as metal or the like. Further, the case 14 may include an insulating resin part and a metal part.

The patch antenna 10F is the patch antenna obtained by partially changing the shape of the patch antenna 10E of the third embodiment illustrated in FIGS. 7 to 8B. That is, the patch antenna 10F includes the ground conductor 20F, which includes ground conductor main body portion 21F and ground conductor bent portions 22F, as in the patch antenna 10E of the third embodiment illustrated in FIGS. 7 to 8B. The ground conductor main body portion 21F includes an outer conductor connection portion 23F to which the outer conductor (not illustrated) of a feeder is connected. Further, the patch antenna 10F includes a radiating element 30F, which includes a radiating element main body portion 31F and a radiating element bent portion 32F.

Explanations of the numbers of the ground conductor bent portions 22F and the radiating element bent portions 32F, the inclination angle with respect to the ground conductor main body portion 21F and the radiating element main body portion 31F, and other characteristics of the patch antenna 10F are the same as of the patch antenna 10E in the third embodiment, and thus are omitted. Accordingly, in the patch antenna 10F in the antenna device 60 as well, it is possible to downsize the patch antenna 10F and suppress the reduction in the gain in the direction of radiation.

In the patch antenna 10F, the slit 12 is formed at the radiating element 30F, as in the patch antenna 10B of the first modification example described above. This makes it possible to change the transmission line of the radiating element 30F and increase the electrical length of the radiating element 30F. With an increase in the electrical length of the radiating element 30F, the resonance frequency can be lowered (to the low frequency side). Further, the radiating element 30F can be fixed to the case by fitting, in the slit 12, a protrusion (not illustrated) such as a claw member formed at the case 14. That is, the antenna device 60 of an embodiment of the present disclosure negates the need for another member to fix the radiating element 30F to the case 14, thereby being able to further downsize the antenna device 60.

The patch antenna 10F includes the dielectric 13 as with the patch antenna 10C of the second modification example described above. The dielectric 13 is arranged between the ground conductor 20F and the radiating element 30F, and is made of ABS resin that is the same as of the case 14. However, the dielectric 13 may be formed of a dielectric material such as ceramic and the like. In the antenna device 60 of an embodiment of the present disclosure, with the dielectric 13 being arranged between the ground conductor 20F and the radiating element 30F, the distance between the ground conductor 20F and the radiating element 30F can be maintained. Further, with the use of the dielectric 13 having a high dielectric constant, it is possible to achieve an effect of reduction in wavelength due to the dielectric constant of the dielectric, and further downsize the patch antenna 10F.

The substrate 15 is a plate-shaped member at which a conductive pattern (not illustrated) is formed. As illustrated in FIGS. 15 and 16, the substrate 15 is located so as to sandwich the ground conductor main body portion 21F of the ground conductor 20F between the substrate 15 and the radiating element 30F. Further, the substrate 15 includes a mounting part 17 to which the feeder 16 is to be mounted, as illustrated in FIG. 15. The mounting part 17 illustrated in FIG. 15 is a part of the substrate 15 to which the feeder 16 is to be attached by soldering or the like (not illustrated), but the feeder 16 may also be formed of a connector or the like that is insertable and removable, for example.

Incidentally, in the antenna device 60, the radiating element 30F includes an inner conductor connection portion 34F formed so as to protrude toward the ground conductor 20F side, as illustrated in FIGS. 15 and 16. This inner conductor connection portion 34F is inserted into a through hole 18 formed in the ground conductor 20F, and the end part of the inner conductor connection portion 34F is connected to the inner conductor of the feeder 16. This negates the need to extend the inner conductor of the feeder 16 and connect it to the radiating element main body portion 31F, and makes it possible to easily connect the inner conductor of the feeder 16 to the radiating element main body portion 31F. That is, this negates the need to add a part to connect the inner conductor of the feeder 16 to the radiating element main body portion 31F, thereby being able to configure the antenna device more easily.

As described above, the ground conductor main body portion 21F includes the outer conductor connection portion 23F to which the outer conductor of the feeder is connected. However, the ground conductor main body portion 21F does not have to include the outer conductor connection portion 23F. When the ground conductor main body portion 21F does not include the outer conductor connection portion 23F, the outer conductor of the feeder 16 may be connected directly to the substrate 15, such as by soldering or the like. A configuration may be such that the inner conductor of the feeder 16 is connected to the inner conductor connection portion 34F through the feed line formed of the conductive pattern provided at the substrate 15.

SUMMARY

The patch antennas 10 and 10A to 10F, and the antenna device 60 of embodiments of the present disclosure have been described. The patch antenna 10 includes, for example, as illustrated in FIGS. 1 to 2B, the first element (the ground conductor 20) and the second element (the radiating element 30) located so as to face the first element, wherein the first element includes the first main body portion (the ground conductor main body portion 21) facing the second element and at least one first bent portion (the ground conductor bent portion 22) extending from the first main body portion toward the second element, and the wave source 11 is generated between the second element and the first bent portion. According to such a patch antenna 10, it is possible to downsize the patch antenna 10 and suppress the reduction in the gain in the direction of radiation.

Further, in the patch antenna 10, for example, as illustrated in FIGS. 1 to 2B, the first element (the ground conductor 20) includes two first bent portions (the ground conductor bent portions 22), and the two first bent portions are located so as to face each other. This makes it possible to downsize the patch antenna 10, and suppress the reduction in the gain in the direction of radiation.

Further, in the patch antenna 10E, for example, as illustrated in FIGS. 7 to 8B, the second element (the radiating element 30E) includes a second main body portion (the radiating element main body portion 31E) facing the first main body portion (the ground conductor main body portion 21) of the first element (the ground conductor 20) and at least one second bent portion (the radiating element bent portion 32E) extending from the second main body portion (the radiating element main body portion 31E) and facing the at least one first bent portion (the ground conductor bent portion 22). This makes it possible to downsize the patch antenna 10E, and suppress the reduction in the gain in the direction of radiation.

Further, in the patch antenna 10E, for example, as illustrated in FIGS. 7 to 8B, the second element (the radiating element 30E) includes two second bent portions (the radiating element bent portions 32E), and the two second bent portions (the radiating element bent portions 32E) are located so as to face each other. This makes it possible to downsize the patch antenna 10E, and suppress the reduction in the gain in the direction of radiation.

In the patch antenna 10E, for example, as illustrated in FIG. 12, the electrical length L2 of the second element (the radiating element 30E) is a quarter or more and a half or less of the wavelength of the frequency supported by the patch antenna 10E. This makes it possible to perform at least one of reception for transmission of radio waves in a wide range of angle.

Further, in the patch antenna 10E, for example, as illustrated in FIG. 13, the electrical length L1 of the first element (the ground conductor 20) is longer than the electrical length L2 of the second element (the radiating element 30E), and the difference X between the electrical length L1 of the first element and the electrical length L2 of the second element is one sixteenth or more and a quarter or less of the wavelength of the frequency supported by the patch antenna 10E. This makes it possible to perform at least one of reception or transmission of radio waves in a wide range of angle.

Further, in the patch antenna 10E, for example, as illustrated in FIG. 14, the distance D between the first element (the ground conductor 20) and the second element (the radiating element 30E) is a quarter or less of the wavelength of the frequency supported by the patch antenna 10E. This makes it possible to perform at least one of reception or transmission of radio waves in a wide range of angle.

Further, in the patch antenna 10B, for example, as illustrated in FIG. 4, at least either one of the first element (the ground conductor 20) or the second element (the radiating element 30B) has at least one slit 12. This makes it possible to increase the electrical length of the element (in FIG. 4, the radiating element 30B) having the slit 12 and lower the resonant frequency (to the low frequency side). In addition, this negates the need for another member to fix the radiating element 30B to the case, thereby being able to downsize the patch antenna 10B.

Further, the patch antenna 10C, for example, as illustrated in FIG. 5, further includes the dielectric 13 between the first element (the ground conductor 20) and the second element (the radiating element 30). This makes it possible to maintain the distance between the first element and the second element. In addition, it is possible to achieve an effect of reduction in wavelength due to the dielectric constant of the dielectric 13, and further downsize the patch antenna 10C.

Further, in the patch antenna 10, for example, as illustrated in FIGS. 1 and 2A, the bent portion (the ground conductor bent portion 22) extends from the main body portion (the ground conductor main body portion 21) toward the second element (the radiating element 30). This makes it possible to downsize the patch antenna 10, and suppress the reduction in the gain in the direction of radiation.

Further, the antenna device 60 includes, for example, as illustrated in FIGS. 15 and 16, the patch antenna 10F having at least one of the characteristics described above, and the substrate 15 located so as to sandwich the first main body portion (the ground conductor main body portion 21F) of the first element (the ground conductor 20F) between the substrate 15 and the second element (the radiating element 30F). This makes it possible to downsize the patch antenna 10F, and suppress the reduction in the gain in the direction of radiation.

Further, in the antenna device 60, for example, as illustrated in FIGS. 15 and 16, the substrate 15 includes the mounting part 17 to which the feeder 16 is to be mounted, the first element (the ground conductor 20F) includes the outer conductor connection portion 23F to which the outer conductor of the feeder 16 is to be connected, the second element (the radiating element 30F) includes the inner conductor connection portion 34F that is formed so as to protrude toward the first element and is inserted into the through hole 18 formed in the first element, and the end part of the inner conductor connection portion 34F is connected to the inner conductor of the feeder 16. This makes it possible to downsize the patch antenna 10F, and suppress the reduction in the gain in the direction of radiation.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

REFERENCE SIGNS LIST

10, 10A to 10F patch antenna
11 wave source 12 slit
13 dielectric
14 case
15 substrate
16 feeder
17 mounting part
18 through hole
20, 20A, 20D, 20F ground conductor
21, 21F ground conductor main body portion
22, 22F ground conductor bent portion
23, 23F outer conductor connection portion
30, 30A, 30B, 30D to 30F radiating element
31D, 31E, 31F radiating element main body portion
32D, 32E, 32F radiating element bent portion
33 feeding portion
34, 34F inner conductor connection portion
60 antenna device

The invention claimed is:

1. A patch antenna comprising:
a first element; and
a second element located so as to face the first element, wherein
the first element includes:
a first main body portion facing the second element, and
at least one first bent portion extending from the first main body portion toward the second element, and
a wave source is generated between the second element and the first bent portion,
wherein the second element includes:
a second main body portion facing the first main body portion of the first element, and
at least one second bent portion extending from the second main body portion and facing the at least one first bent portion.

2. The patch antenna according to claim 1, wherein
the first element includes two first bent portions, and
the two first bent portions are located so as to face each other.

3. The patch antenna according to claim 1, wherein
the second element includes two second bent portions, and
the two second bent portions are located so as to face each other.

4. The patch antenna according to claim 1, wherein an electrical length of the second element is a quarter or more and a half or less of a wavelength of a frequency supported by the patch antenna.

5. The patch antenna according to claim 1, wherein
an electrical length of the first element is longer than an electrical length of the second element, and
a difference between the electrical length of the first element and the electrical length of the second element is one-sixteenth or more and a quarter or less of a wavelength of a frequency supported by the patch antenna.

6. The patch antenna according to claim 1, wherein a distance between the first element and the second element is a quarter or less of a wavelength of a frequency supported by the patch antenna.

7. The patch antenna according to claim 1, wherein
at least one of the first element or the second element includes at least one slit.

8. The patch antenna according to claim 1, further comprising a dielectric between the first element and the second element.

9. The patch antenna according to claim 1, wherein
the first bent portion extends from the first main body portion toward the second element.

10. An antenna device comprising:
the patch antenna according to claim 1, and
a substrate located so as to sandwich the first main body portion of the first element between the substrate and the second element.

11. The antenna device according to claim 10, wherein the substrate includes a mounting part to which a feeder is to be mounted, the first element includes an outer conductor connection portion to which an outer conductor of the feeder is to be connected, the second element includes an inner conductor connection portion that is formed so as to protrude toward the first element and is inserted into a through hole formed in the first element, and an end part of the inner conductor connection portion is connected to an inner conductor of the feeder.

12. A patch antenna comprising:

a first element; and a second element located so as to face the first element, wherein the first element includes:

a first main body portion facing the second element, and at least one first bent portion extending from the first main body portion toward the second element, and a wave source is generated between the second element and the first bent portion, wherein each shape of the first element and the second element is a quadrangle in plan view, comprising a long side and a short side, and wherein the length of the short side of the first element is equal to the length of the short side of the second element.

13. The patch antenna according to claim 12, wherein the first element includes two first bent portions, and the two first bent portions are located so as to face each other.

14. The patch antenna according to claim 12, wherein the second element includes:

a second main body portion facing the first main body portion of the first element, and at least one second bent portion extending from the second main body portion and facing the at least one first bent portion.

15. The patch antenna according to claim 14, wherein the second element includes two second bent portions, and the two second bent portions are located so as to face each other.

16. The patch antenna according to claim 12, wherein an electrical length of the second element is a quarter or more and a half or less of a wavelength of a frequency supported by the patch antenna.

17. The patch antenna according to claim 12, wherein an electrical length of the first element is longer than an electrical length of the second element, and a difference between the electrical length of the first element and the electrical length of the second element is one-sixteenth or more and a quarter or less of a wavelength of a frequency supported by the patch antenna.

18. The patch antenna according to claim 12, wherein a distance between the first element and the second element is a quarter or less of a wavelength of a frequency supported by the patch antenna.

19. The patch antenna according to claim 12, wherein at least one of the first element or the second element includes at least one slit.

20. The patch antenna according to claim 12, further comprising a dielectric between the first element and the second element.

* * * * *